US011818797B2

(12) United States Patent
Oak et al.

(10) Patent No.: US 11,818,797 B2
(45) Date of Patent: Nov. 14, 2023

(54) METHOD AND APPARATUS FOR CONTROLLING UE CONTEXT IN WIRELESS COMMUNICATION SYSTEM

(71) Applicant: Samsung Electronics Co., Ltd., Suwon-si (KR)

(72) Inventors: Jeongyeob Oak, Suwon-si (KR); Jisoo Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 17/503,548

(22) Filed: Oct. 18, 2021

(65) Prior Publication Data

US 2022/0038888 A1 Feb. 3, 2022

Related U.S. Application Data

(63) Continuation of application No. 16/791,104, filed on Feb. 14, 2020, now Pat. No. 11,153,749.

(30) Foreign Application Priority Data

Feb. 14, 2019 (KR) .................... 10-2019-0017344
Feb. 15, 2019 (KR) .................... 10-2019-0018223

(51) Int. Cl.
*H04W 8/24* (2009.01)
*H04W 24/02* (2009.01)
(52) U.S. Cl.
CPC ............. *H04W 8/24* (2013.01); *H04W 24/02* (2013.01)
(58) Field of Classification Search
None
See application file for complete search history.

(56) References Cited

U.S. PATENT DOCUMENTS

2011/0317545 A1 12/2011 Tiwari
2015/0143463 A1* 5/2015 Baghel ............... H04W 12/033
726/3
2018/0324651 A1 11/2018 Tenny et al.
(Continued)

FOREIGN PATENT DOCUMENTS

WO 2016/122388 A1 8/2016

OTHER PUBLICATIONS

3GPP TSG-RAN WGS3 NR AdHoc 1801 R3-180180 (Year: 2018).*
(Continued)

*Primary Examiner* — Ernest G Tacsik
(74) *Attorney, Agent, or Firm* — Jefferson IP Law, LLP

(57) ABSTRACT

A method and an apparatus for controlling user equipment (UE) context between a plurality of nodes are provided. The method includes transmitting, to a second node, a first message to request a user equipment (UE) context update, receiving, from the second node, a second message indicative of a completion of the UE context update or a third message indicative of a failure of the UE context update in response to the transmission of the first message, and determining whether to retransmit the first message to the second node based on the reception of the second message or the third message. The procedure of the UE context update may be initiated by the transmission of a message to request an operation of the UE context update to be performed between a UE and a third node from the second node to the third node.

18 Claims, 24 Drawing Sheets

(56) References Cited

U.S. PATENT DOCUMENTS

| | | | |
|---|---|---|---|
| 2019/0037631 A1 | 1/2019 | Byun et al. | |
| 2019/0075023 A1* | 3/2019 | Sirotkin | H04W 88/08 |
| 2019/0215756 A1 | 7/2019 | Park et al. | |
| 2020/0163140 A1 | 5/2020 | Mochizuki et al. | |
| 2020/0351954 A1* | 11/2020 | Turtinen | H04W 74/0833 |
| 2020/0396740 A1* | 12/2020 | Toeda | H04W 72/541 |
| 2021/0243656 A1* | 8/2021 | Paterson | H04W 36/0033 |

OTHER PUBLICATIONS

ZTE, Discussion on SCell management in CU-DU deployment, R3-180899, 3GPP TSG RAN WG3#99 Meeting, Feb. 14, 2018, Athens, Greece, XP051401271.

CATT, TP for TS 38.473 on UE Context Management procedure, R3-180180, 3GPP TSG-RAN WG3 NR AdHoc 1801, Jan. 12, 2018, Sophia Antipolis, France, XP051387212.

CATT, Discussion on UE Context Management procedure, R3-180179, 3GPP TSG-RAN WG3 NR AdHoc 1801, Jan. 12, 2018, Sophia Antipolis, France, XP051387211.

Samsung, UE context modification procedure, R3-172964, 3GPP TSG-RAN WG3 Meeting #97, Aug. 21, 2017, Berlin, Germany, XP051319804.

Samsung, UE context modification refuse, R3-190446, 3GPP TSG-RAN WG3 Meeting #103, Feb. 15, 2019, Athens, Greece, XP051604387.

European Search Report dated Feb. 18, 2022, issued in European Application No. 20756319.8.

3rd Generation Partnership Project; Technical Specification Group Radio Access Network;NG-RAN; F1 application protocol (F1AP), '3GPP; TSG RAN; NG-RAN; F1AP (Release 15)',3GPP TS 38.473 V15.4.1, sections 8.2.3.3, 8.3.5.2; and figures 8.2.3.3-1, 8.3.5.2-1: Jan. 14, 2019.

Ericsson, 'Rapporteur updates on version 15.4.0', R3103_023_36423-f40_Rapp_Corrections, 3GPP, Feb. 12, 2019 [retrieved on May 12, 2020].Retrieved from the Internet: <URL: https://www.3gpp.org/ftp/email_discussions/ran3/ran3_102/rapporteur%20work/X2AP> sections 3.7.6.2, 8.7.7.2-8.7.11.1: May 12, 2020.

Ericsson et al., 'RRC Delivery Indication', R3-186121, 3GPP TSG-RAN WG3,NR #101bis, Oct. 15, 2018 section 8: Oct. 15, 2018.

Samsung, 'CR on Scell release for RLC failure', R3-187213, 3GPP TSG-RAN,WG3 #102, section 8.3.4: Nov. 20, 2018.

International Search Report and written opinion dated May 20, 2020, issued in an International Application No. PCT/KR2020/002112.

3GPP TSG-RAN WG3 #103 R3-191099_UEModRefuse_CR_v3.0 (Year: 2019).

3GPP 36423-f40 V15.4.0 X2 application protocol (X2AP) Dec. 2018 (Year: 2018).

38473-f41 V15.4.1 F1 application protocol (F1AP) Jan. 2019 (Year: 2019).

Indian Examination Report dated Apr. 10, 2023, issued in Indian Application No. 202117036778.

* cited by examiner

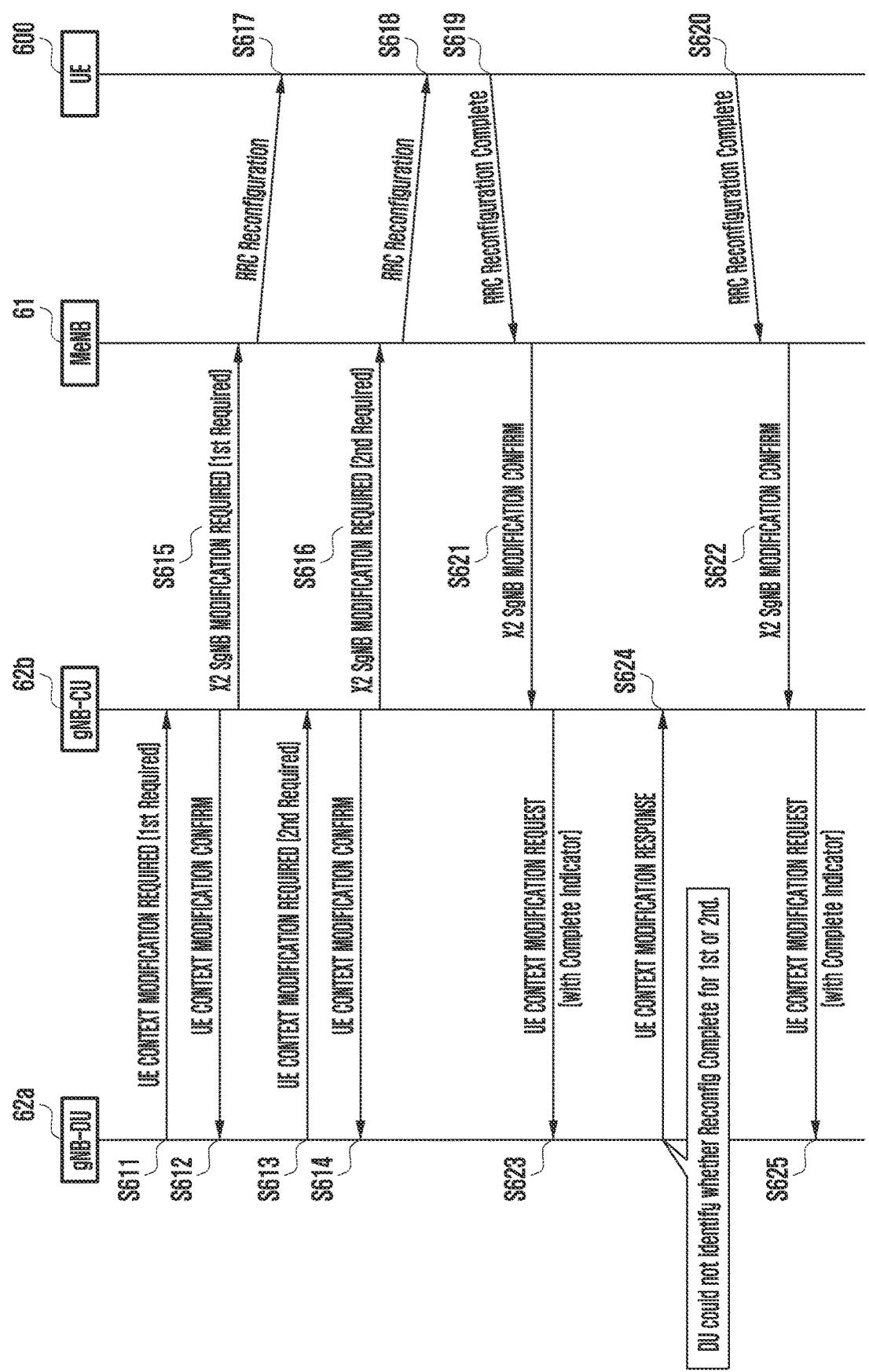

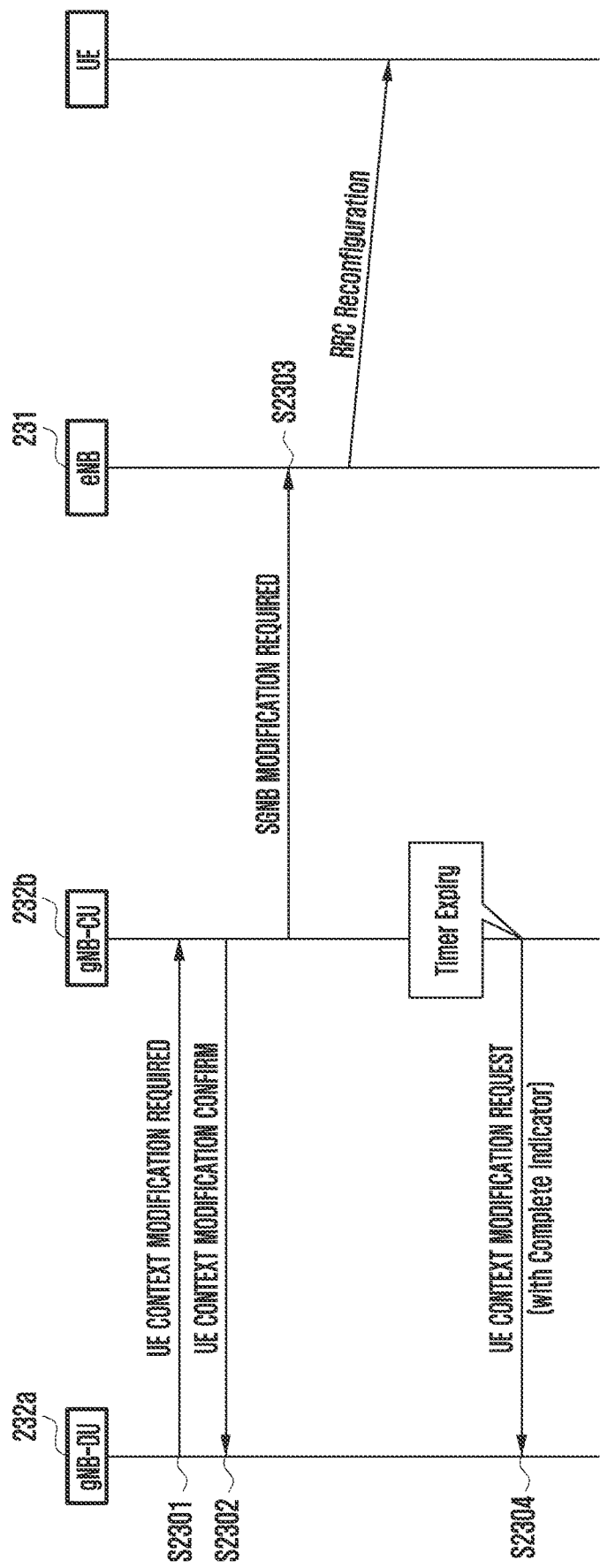

METHOD AND APPARATUS FOR CONTROLLING UE CONTEXT IN WIRELESS COMMUNICATION SYSTEM

CROSS-REFERENCE TO RELATED APPLICATION(S)

This application is a continuation application of prior application Ser. No. 16/791,104, filed on Feb. 14, 2020, which is based on and claims priority under 35 U.S.C. § 119 of a Korean patent application number 10-2019-0017344, filed on Feb. 14, 2019, in the Korean Intellectual Property Office and a Korean patent application number 10-2019-0018223, filed on Feb. 15, 2019, in the Korean Intellectual Property Office, the disclosure of each of which is incorporated by reference herein in its entirety.

BACKGROUND

1. Field

The disclosure relates to a method and apparatus for controlling user equipment (UE) context between a plurality of nodes.

2. Description of Related Art

In order to satisfy wireless data traffic demands that tend to increase after $4^{th}$ Generation (4G) communication system commercialization, efforts to develop an enhanced $5^{th}$ Generation (5G) communication system or a pre-5G communication system are being made. For this cause, the 5G communication system or pre-5G communication system is called a beyond 4G network communication system or a post long-term evolution (LTE) system. In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive multiple-in, multiple-out (MIMO), full dimensional MIMO (FD-MIMO), array antenna, analog beamforming and large-scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid frequency shift key (FSK) and quadrature amplitude modulation (QAM) modulation (FQAM) and sliding window super-position coding (SWSC) that are advanced coding modulation (ACM) schemes, improved filter bank multi-carrier (FBMC), non-quadrature multiple access (NOMA) and sparse code multiple access (SCMA) are being developed in the 5G system.

The Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched.

Furthermore, in the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

In the 5G technology, a none stand-alone (NSA) new radio (NR) standard in which the LTE technology and the new radio (NR) technology operate together has been introduced, and an evolved universal terrestrial radio access (EUTRA) NR dual connectivity (EN-DC) structure between an LTE base station and an NR base station is supported. In the connection structure of such a multi-radio access technology (RAT) dual-connectivity type, an apparatus, such as a terminal, performs radio access using an LTE base station as a master node and using an NR base station as a secondary node.

Furthermore, as the amount of processed data requested in a wireless communication process explosively increases, a technology in which the existing protocol layers within a base station are separated and implemented into a central unit (CU) and a distributed unit (DU) has been introduced into 5G. Layers included in a single base station to configure a protocol stack are separated into a CU base station and a DU base station, and a fronthaul interface is configured between the CU base station and the DU base station, thereby being capable of transmitting and receiving signaling.

If a UE requires a change or update of UE context in the state in which the UE has accessed an LTE base station and NR base station in the EN-DC connection structure, it is necessary for a signaling operation between several nodes, such as a CU base station and DU base station separated from the LTE base station and NR base station, to be efficiently performed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of efficiently performing the update procedure of user equipment (UE) context between several nodes in a non-stand-alone (NSA) structure.

Additional aspects will be set forth in part in the description which follows and, in part, will be apparent from the description, or may be learned by practice of the presented embodiments.

In accordance with an aspect of the disclosure, a method of a first node in a wireless communication system is provided. The method includes transmitting, to a second node, a first message to request a user equipment (UE) context update, receiving, from the second node, a second message indicating a completion of the UE context update or a third message indicating a failure of the UE context update in response to the transmission of the first message, and determining whether to retransmit the first message to the second node based on a reception of the second message or the third message. A procedure of the UE context update may be initiated by the transmission of a message to request an operation of the UE context update performed between a UE and a third node from the second node to the third node.

In accordance with another aspect of the disclosure, a method of a second node in a wireless communication system is provided. The method includes receiving, from a first node, a first message to request a user equipment (UE) context update, transmitting, to a third node, a message to request an operation of the UE context update to be performed between the third node and a UE in response to a reception of the first message, confirming a result of the UE context update initiated based on the message transmitted to the third node, and transmitting, to the first node, a second message indicating a completion of the UE context update or a third message indicating a failure of the UE context update based on a result of the confirmation.

In accordance with another aspect of the disclosure, a first node in a wireless communication system is provided. The first node includes a transceiver, and at least one processor configured to control the transceiver to transmit, to a second node, a first message to request a user equipment (UE) context update and receive, from the second node, a second message indicating a completion of the UE context update or a third message indicating a failure of the UE context update in response to the transmission of the first message, and determine whether to retransmit the first message to the second node based on a reception of the second message or the third message. A procedure of the UE context update may be initiated by a transmission of a message to request an operation of the UE context update performed between a UE and a third node from the second node to the third node.

In accordance with another aspect of the disclosure, a second node in a wireless communication system is provided. The second node includes a transceiver, and at least one processor configured to control the transceiver to receive, from a first node, a first message to request a user equipment (UE) context update, and transmit, to a third node, a message to request an operation of the UE context update to be performed between the third node and a UE in response to a reception of the first message, to confirm a result of the UE context update initiated based on the message transmitted to the third node, and transmit, to the first node, a second message indicating a completion of the UE context update or a third message indicating a failure of the UE context update based on a result of the confirmation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 6B is a flowchart for describing signaling when a DU consecutively triggers the update of UE context according to an embodiment of the disclosure;

FIG. 23 is a diagram for describing an embodiment for a change after CONFIRM for a UE CONTEXT MODIFICATION REQUIRED request according to an embodiment of the disclosure.

Throughout the drawings, like reference numerals will be understood to refer to like parts, components, and structures.

DETAILED DESCRIPTION

Figure 1:
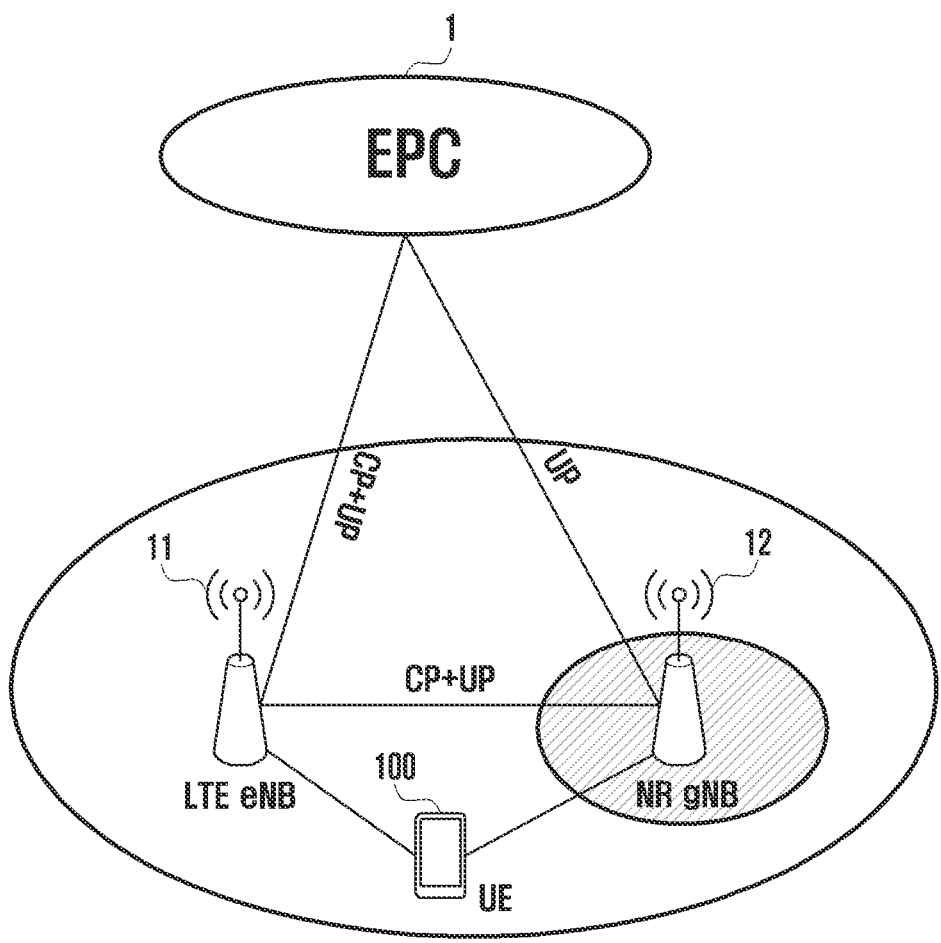
FIG. 1 is concept view illustrating a multi-radio access technology (RAT) dual connectivity structure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure, a detailed description of a related known function or configuration will be omitted if it is deemed to make the gist of the disclosure unnecessarily vague. Furthermore, terms to be described hereinafter have been defined by taking into consideration functions in the disclosure, and may be different depending on a user, an operator's intention or practice. Accordingly, each term should be defined based on contents over the entire specification.

Furthermore, in describing the embodiments of the disclosure in detail, a major gist of the disclosure may be slightly modified and applied to other communication systems having a similar technical background and a channel form without significantly departing from the range of the disclosure, which may be determined by a person having skilled technical knowledge in a corresponding technical field of the disclosure.

The merits and characteristics of the disclosure and a method of achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s).

These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s).

The computer program instructions may also be loaded on a computer or other programmable data processing apparatus to cause a series of operations to be performed on the computer or other programmable apparatus to produce a computer-executed process, so that the instructions performing the computer or other programmable apparatus provide operations for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors.

Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more central processing units (CPUs) within a device or a security multimedia card.

Hereinafter, a method of efficiently performing signaling between nodes for control of user equipment (UE) context in a DC structure between multi-radio access technologies (RATs) according to an embodiment of the disclosure is described more specifically with reference to the accompanying drawings.

FIG. 1 is concept view illustrating a multi-RAT dual connectivity structure according to an embodiment of the disclosure.

Referring to FIG. 1, a structure for EN-DC for describing an embodiment of the disclosure may be configured as illustrated in FIG. 1.

More specifically, a connection structure for EN-DC according to an embodiment of the disclosure may be a structure in which an long term evolution (LTE) base station 11, that is, a master eNB, anchors the C-plane signaling of NR, an NR base station 12 is configured as a secondary eNB, and each base station uses an evolved packet core (EPC) 1 as a core network.

A UE 100 according to an embodiment of the disclosure may access each base station through dual connectivity using the LTE base station 11 as a master eNB and the NR base station 12 as a secondary eNB.

Figure 2:
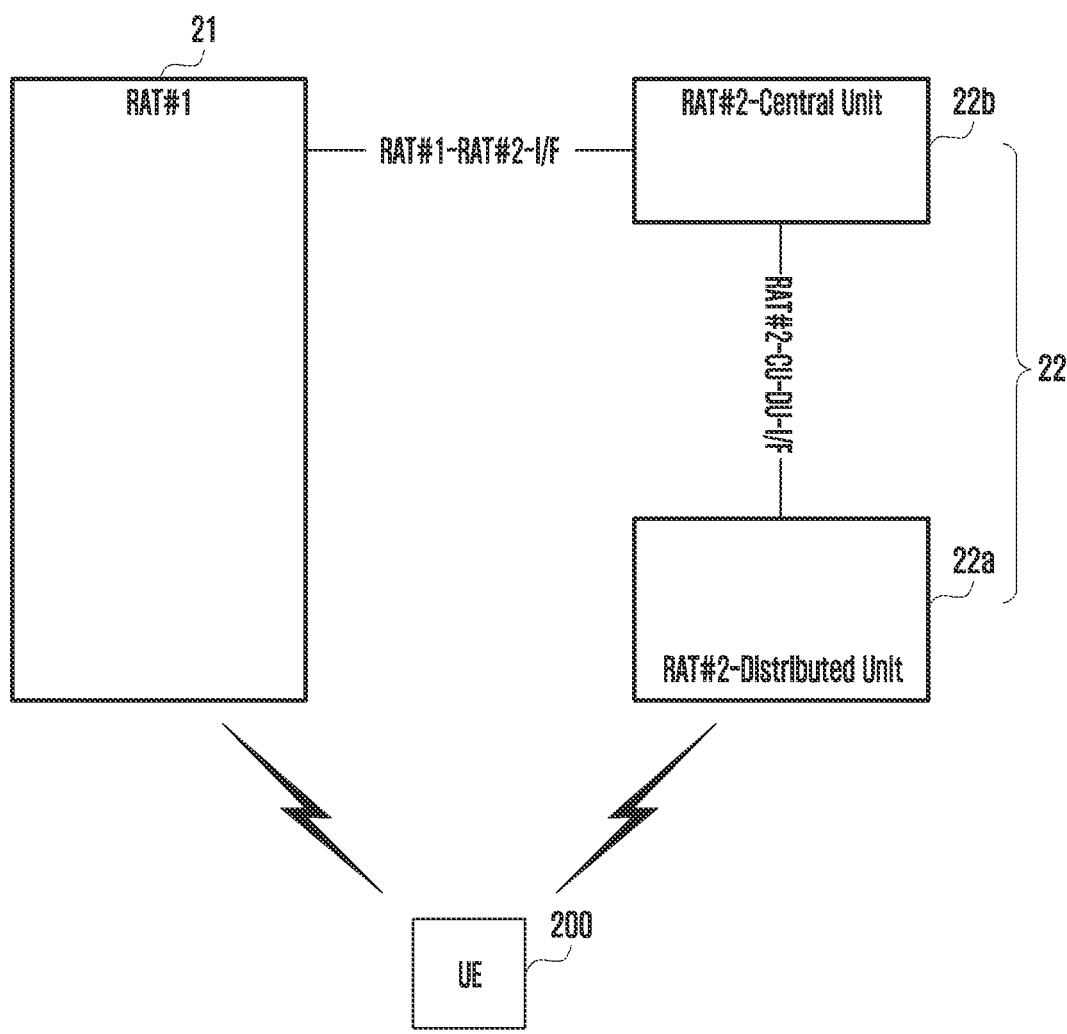
FIG. 2 is concept view illustrating a connection between nodes and a user equipment (UE) according to an embodiment of the disclosure.

FIG. 2 is concept view illustrating a connection between nodes and a UE according to an embodiment of the disclosure.

Figure 3:
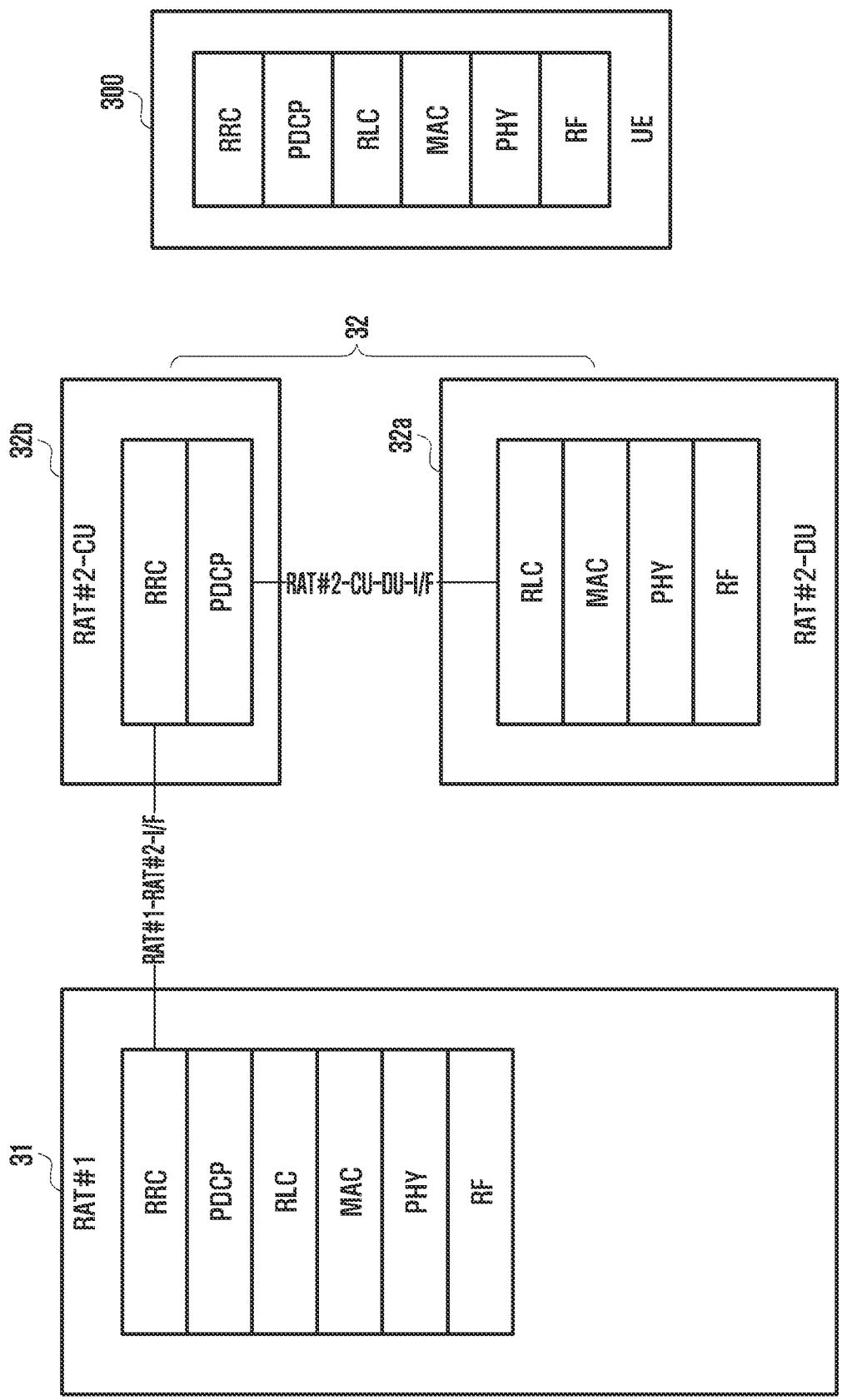
FIG. 3 is concept view illustrating protocol stacks configured in nodes and a UE according to an embodiment of the disclosure.

FIG. 3 is concept view illustrating protocol stacks configured in nodes and a UE according to an embodiment of the disclosure.

Referring to FIG. 2, an NR base station according to an embodiment of the disclosure may be configured by separating protocol stacks, included in one base station, for each function and separating the protocol stacks into a central unit (CU) and a distributed unit (DU). In this case, the CU and the DU may be implemented as separate base stations, and may perform respective operations of the base station. In the following embodiment, the CU and the DU may be described as a base station, a unit or a node.

FIG. 2 illustrates the state in which a UE 200 according to an embodiment of the disclosure has accessed an LTE base station (RAT #1) 21 and an NR base station 22 separated into a CU base station (RAT #2-CU) 22b and a DU base station (RAT #2-DU) 22a.

Referring to FIG. 2, the LTE base station 21 and the CU 22b of the NR base station 22 may be connected through an X2 interface (RAT #1-RAT #2-I/F). The CU 22b of the NR base station 22 and the DU 22a of the NR base station 22 may be connected through a fronthaul interface (RAT #2-CU-DU-I/F). Hereafter, the CU base station is described as a CU and the DU base station is described as a DU, for convenience of description.

A more detailed protocol stack is illustrated in FIG. 3.

Referring to FIG. 3, in an LTE base station 31, all the functions of a radio resource control (RRC) layer, a packet data convergence protocol (PDCP) layer, a radio link control (RLC) layer, a medium access control (MAC) layer, a physical (PHY) layer and a radio frequency (RF) layer may be implemented and may operate.

In contrast, in an NR base station 32, protocol layers may be separated based on respective functions. The RRC layer and PDCP layer may be configured as a CU 32b, and the RLC layer, MAC layer, PHY layer and RF functions may be configured as a DU 32a. That is, the CU 32b may perform functions corresponding to the RRC layer and PDCP layer, and the DU 32a may perform the functions of the RLC layer, the MAC layer, the PHY layer and the RF.

According to an embodiment of the disclosure, all the protocol stacks of a UE 300 that configures dual connectivity with the LTE base station 31 and the NR base station 32 may be included and implemented like the LTE base station 31.

The function of each layer is briefly described as follows. The PDCP layer is responsible for operations, such as IP header compression/reconstruction. The RLC layer reconfigures a PDCP packet data unit (PDU) in a proper size. The MAC layer is connected to several RLC layers, and performs operations of multiplexing RLC PDUs into a MAC PDU and demultiplexing RLC PDUs from a MAC PDU. The PHY layer performs an operation of performing channel coding and modulation on higher layer data, producing the data into an OFDM symbol, transmitting the OFDM symbol to a radio channel or demodulating an OFDM symbol received through a radio channel, channel-decoding the symbol and transmitting it to a higher layer. Furthermore, the PHY layer uses a hybrid automatic repeat query (HARQ) for error correction along with the MAC layer. A receiving stage transmits 1 bit indicating whether a packet transmitted by a transmitting stage has been received. This is called HARQ ACK/NACK information. The RRC layer is defined only in a C-plane. The RRC layer is responsible for control of other channels related to the configuration, reconfiguration and release of radio bearers.

If protocol layers are separated for each function in the NR base station 32 and implemented as the DU 32a and the CU 32b as described above, in a connection with the UE 300 through EN-DC, the number of nodes that perform signaling according to wireless communication with the UE 300 may be 3 or more. This may mean that a given operation related to the UE is triggered or three or more nodes may be involved in controlling a given operation for the UE.

For example, a measurement value, scheduling information, antenna information or beam characteristic information for each cell are parameters related to the RF or the MAC layer or the PHY layer, and may need to be controlled for each UE. If a change in such parameters is necessary, the RF or the MAC layer or the PHY layer may perform reporting related to a change in the parameters to the RRC layer so that an RRC message including the parameters is generated in the RRC layer. In this case, in the situation in which an NR base station is separated into a CU and a DU as proposed in the disclosure, the DU needs to transmit, to the CU, a message to request a change in the parameters.

If signaling for a change in the parameters is transmitted from the DU to the CU as described above, the CU may transmit, to an LTE base station, a message to request a change in the parameters. The LTE base station may perform an operation for a change in the parameters through wireless communication with the UE.

If the update of UE context related to the parameters is necessary as described above, corresponding signaling needs to be transmitted and received between the LTE base station and three nodes of the CU and the DU. That is, a communication procedure is performed between several nodes for control of UE context. Accordingly, a problem in that resources are wasted or a communication procedure is inefficiently managed may occur.

Hereinafter, the DU of an NR base station and a first node, the CU of the NR base station and a second node, and an LTE base station and a third node are interchangeably used, for convenience of description.

More detailed examples are described with reference to FIGS. 4, 5, 6A and 6B.

Figure 4:
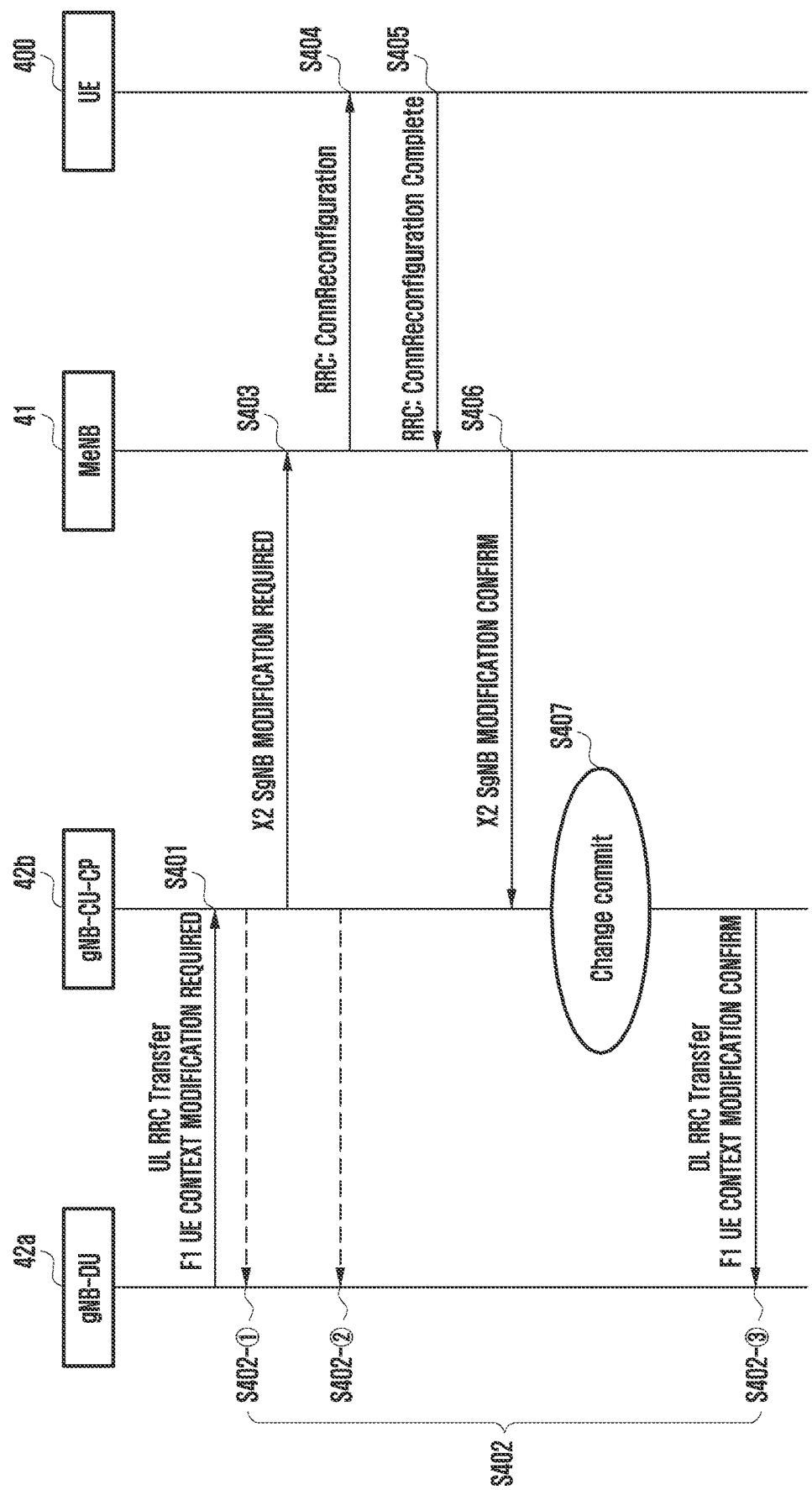
FIG. 4 is a flowchart illustrating signaling for controlling the context of a UE between nodes according to an embodiment of the disclosure.

FIG. 4 is a flowchart illustrating signaling for controlling the context of a UE between nodes according to an embodiment of the disclosure.

Figure 5:
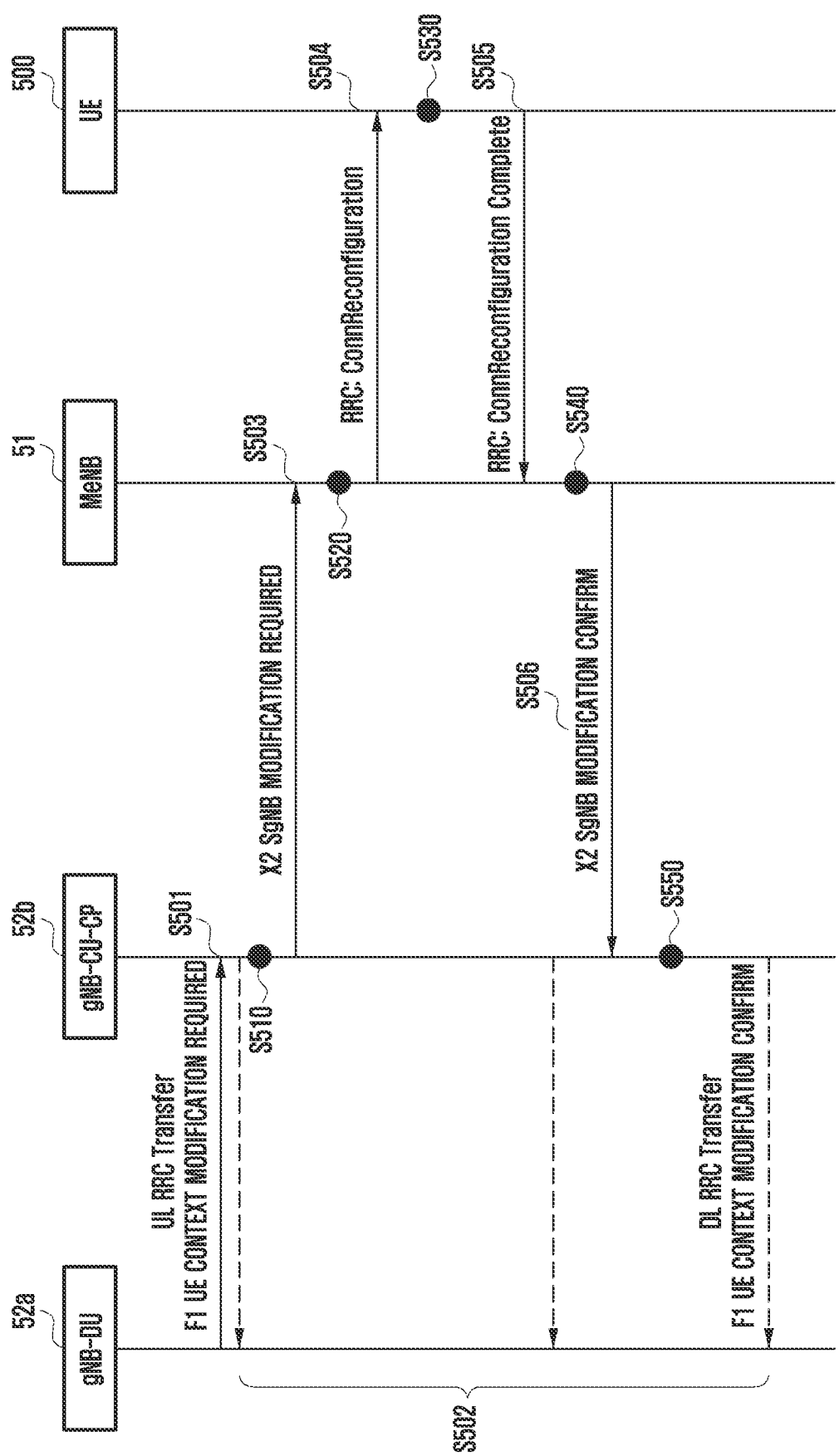
FIG. 5 is a diagram illustrating the situation in which the update procedure of UE context fails in each node according to an embodiment of the disclosure.

FIG. 5 is a diagram illustrating the situation in which the update procedure of UE context fails in each node according to an embodiment of the disclosure.

Figure 6A:
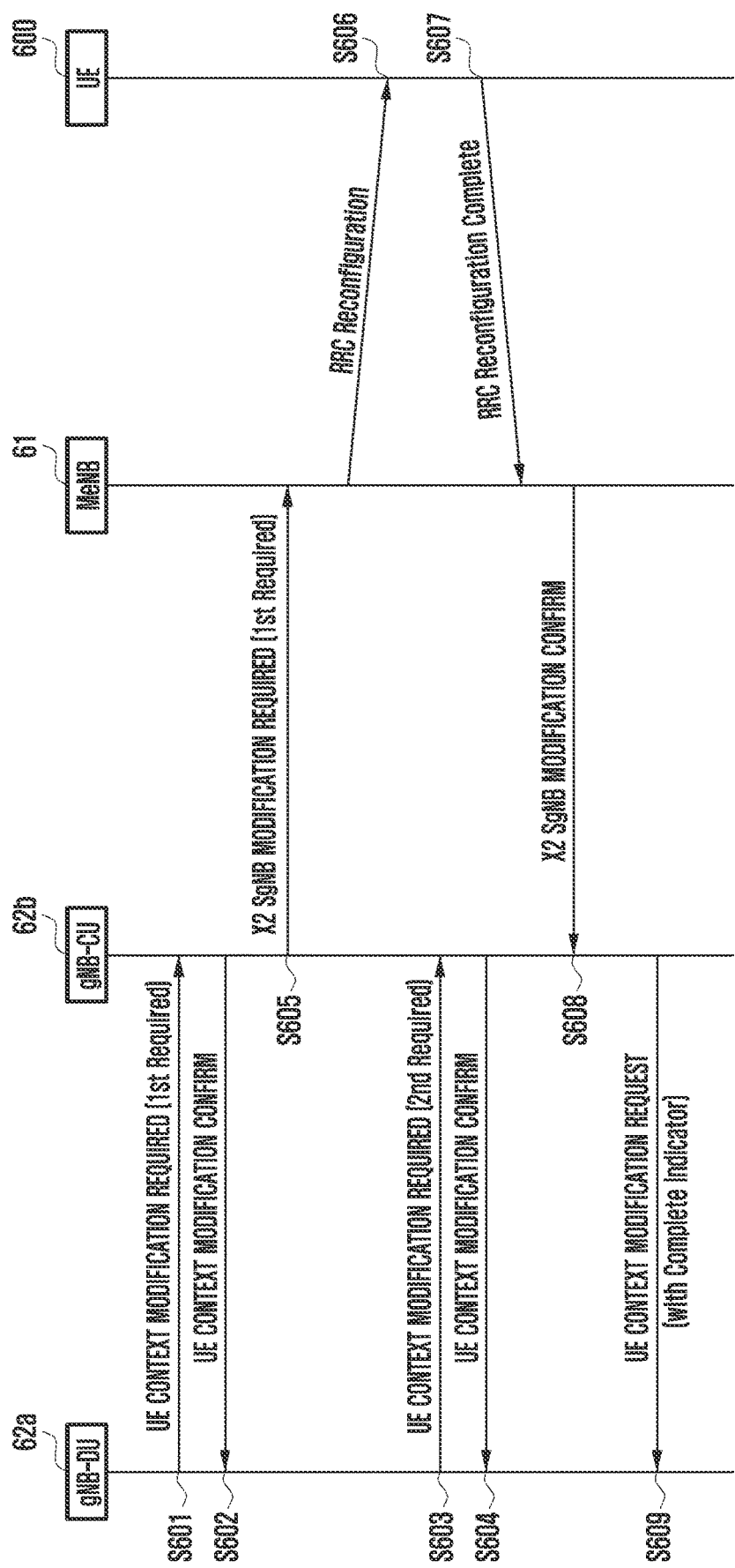
FIG. 6A is a flowchart for describing signaling when a distributed unit (DU) consecutively triggers the update of UE context according to an embodiment of the disclosure.

FIGS. 6A and 6B are flowcharts for describing signaling when a DU consecutively triggers the update of UE context according to various embodiments of the disclosure.

Referring to FIG. 4, if the update of UE context is determined to be necessary, a first node (gNB-DU) 42a may transmit, to a second node (gNB-CU) 42b, a message to request a modification of the UE context (UE CONTEXT MODIFICATION REQUIRED) (S401).

In this case, the UE CONTEXT MODIFICATION REQUIRED message to request a modification of the UE context may include the following information, for example.

TABLE 1

| IE/Group Name | Semantics Description |
|---|---|
| gNB-CU UE F1AP ID | UE delimiter used within a gNB-CU |
| gNB-DU UE F1AP ID | UE delimiter used within a gNB-DU |
| Resource Coordinate Transfer Container | It is a container for carrying an SgNB Resource Coordination Information IE, and includes an NR cell global identifier (NR CGI), UL/DL, and Coordination Information. |
| DU to CU RRC Information | It is a container for carrying RRC layer information, such as Served Cell Information. |
| DRB Required to be Modified List: DRB ID | Target DRB Delimiter to be modified |
| DL UP TNL Information | gNB-CU End Point Information of an F1 transport bearer for DL PDU transfer |
| RLC Status | RLC Status Information reconfigured in a gNB DU |
| SRB Required to be Released List: SRB ID | Target SRB Delimiter to be released |
| DRB Required to be Released List: DRB ID | Target DRB Delimiter to be released |
| Cause | UE Context Modification Required Message Transfer Cause |

The second node 42b that has received the message to request the modification of the UE context from the first node 42a may transmit a corresponding confirm message (F1 UE CONTEXT MODIFICATION CONFIRM) to the first node 42a (S402). Furthermore, the second node 42b may transmit, to a third node (master eNB) 41, a message (X2 SGNB MODIFICATION REQUIRED) to request a modification of the UE context through an X2 interface in response to the request for the modification of the UE context received from the first node 42a (S403).

The third node 41 may perform a context update procedure for a UE 400 based on the UE context request message (X2 SGNB MODIFICATION REQUIRED) received from the second node 42b. For example, as illustrated in FIG. 4, the third node 41 may transmit an RRC message (RRC ConnReconfiguration) for the update of the UE context to the UE 400 (S404).

The UE 400 may perform an operation of updating the context of the UE 400 based on information included in the radio resource control (RRC) message received from the third node 41. When the context update is completed, the UE 400 may transmit, to the third node 41, an RRC message (RRC ConnReconfiguration Complete) including corresponding information (S405).

The third node 41 that has received the RRC connection reconfiguration complete (RRC ConnReconfiguration Complete) message from the UE 400 may transmit, to the second node 42b, information included in the RRC connection reconfiguration complete (RRC ConnReconfiguration Complete) message received from the UE through the X2 interface (S406).

The second node 42b that has received the message including information on the update of the UE context (X2 SGNB MODIFICATION CONFIRM) from the third node 41 may perform a procedure of changing the context of the UE based on the information (S407).

In performing such a procedure, although the update of the UE context has been triggered by the first node 42a, results indicating whether the procedure of the UE context has been properly performed are not transmitted to the first node 42a. In other words, when the UE CONTEXT MODIFICATION REQUIRED message received from the first node 42a is received, the second node 42b performs an operation of transmitting, to the first node 42a, the UE CONTEXT MODIFICATION COMFIRM message to notify that the UE CONTEXT MODIFICATION REQUIRED message has been successfully received regardless of whether the context update procedure of the UE 400 has been completed or has been properly performed.

For example, the UE CONTEXT MODIFICATION COMFIRM message may be transmitted from the second node 42b to the first node 42a in a sense of acknowledge (ACK) notifying that the message received from the first node 42a has been simply successfully received prior to the start of the update procedure of the context for the UE 400, while the update procedure of the context of the UE 400 is performed or after the update procedure of the context of the UE 400 is completed. That is, the UE CONTEXT MODIFICATION COMFIRM message may be transmitted through any one of arrows (S402-①, ②, and ③) indicated as dotted lines in FIG. 4.

As described above, the first node 42a cannot confirm whether the context of the UE has been successfully updated because the UE CONTEXT MODIFICATION CONFIRM message is transmitted from the second node 42b to the first node 42a regardless of whether the substantial update of the UE context has been completed. Particularly, the update procedure of the UE context is performed through signaling between several nodes as described above. Accordingly, a problem may occur if an abnormal situation, such as a failure of transmission and reception in any one node or for any one signaling, occurs.

Referring to FIG. 5, a first node 52a may transmit a message (UE CONTEXT MODIFICATION REQUIRED) for the update of UE context to a second node 52b (S501). The second node 52b may transmit, to the first node 52a, a confirm message for the update of the UE context (UE CONTEXT MODIFICATION CONFIRM) in response thereto (S502).

Referring to FIG. 5, an error may occur in the second node 52b (S510) in the operation of initiating the update procedure of the UE context based on the message received from the first node 52a. Accordingly, an abnormal situation in which the update procedure of the UE context is not initiated may occur.

In contrast, the second node 52b may initiate the update procedure of the UE context based on the message received from the first node 52a, and may transmit, to a third node 51, a message (X2 SGNB MODIFICATION REQUIRED) to request the update of the UE context (S503). In this case, an abnormal situation may occur in which an RRC message to request the context update is not transmitted to a UE 500 due to a given error occurring in the third node 51 (S520) and the update procedure of the UE context ends in failure during the update procedure.

For another example, the third node 51 may transmit, to the UE 500, an RRC message for the execution of a context update procedure based on the update request message for the UE context (X2 SGNB MODIFICATION REQUIRED) received from the second node 52b (S504). In this case, in the UE 500, the reception and processing of the RRC message may fail or an abnormal situation may occur in which the execution of the update procedure of the UE context ends in failure because an error occurs due to a cause of wireless communication (S530).

For another example, the UE 500 may perform a context update operation normally based on the RRC message received from the third node 51, and may transmit a corresponding complete message (RRC ConnReconfiguration Complete) to the third node 51 (S505). In this case, in the third node 51, an error may occur in which the reception of an RRC connection reconfiguration complete message fails (S540). Accordingly, an abnormal situation may occur in which the execution of the update procedure of the UE context ends in failure.

For another example, after the third node 51 receives, from the UE 500, a message (RRC ConnReconfiguration Complete) to notify that the update procedure of the UE context has been completed, it transmits, to the second node 52b, a message (X2 SGNB MODIFICATION CONFIRM) to notify the completion of the update of the UE context through an X2 interface (S506). However, an abnormal situation in which the update procedure of the UE context ends in failure due to a given error (S550) may occur in the second node 52b.

If an NR base station is separated into the nodes of a CU and a DU in the state in which a UE has accessed an LTE base station and the NR base station through an EN-DC connection as described above, a problem occurs in the execution of a given operation if a resource allocation failure, a transmission or reception error, or an error in received information processing occurs because three or more nodes are involved in performing a given operation related to the UE.

The update procedure of UE context may not be performed although processing in any one node or the transmission or reception of any one signaling between two nodes fails as described above. If a request for the update of UE context triggered by a first node is not properly performed, the first node has to trigger the request again. In this case, however, the first node does not receive, from a second node, any information indicating that the update of the UE context has failed. Accordingly, there is a problem in that the first node cannot perform any operation regarding that the first node has to transmit a corresponding re-request message again because a modification of requested UE context has failed or that the first node has to repeatedly transmit how many re-request messages.

In a first node, a request for the update of UE context may be triggered in plural times. For example, the first node may trigger the transmission of a first context request message because a change in a parameter related to beam characteristic information received from a UE is necessary, and may then trigger the transmission of a second context request message because a change in a measurement parameter for the handover of the UE is necessary. If update requests for different parameter information are consecutively triggered as described above, a problem may occur because corresponding signaling is transmitted between several nodes.

Referring to FIG. 6A, when a first node 62a determines that the update of UE context is necessary, it may transmit, to a second node 62b, a message (UE CONTEXT MODIFICATION REQUIRED-1st required) to request the update of the UE context (S601). The second node 62b may transmit a CONFIRM message (UE CONTEXT MODIFICATION CONFIRM) to a first node 61 (S602) in response to the UE CONTEXT MODIFICATION REQUIRED message received from the first node 62a, and may then initiate a context update procedure for a UE 600.

After the first node 62a transmits the UE context update request message to the second node 62b (S601), when a change in a parameter different from the context whose update has been requested is determined to be necessary, the first node 62a may transmit, to the second node 62b, a message (UE CONTEXT MODIFICATION REQUIRED-2nd required) to request a change in another parameter (S603). After the second node 62b transmits a CONFIRM message (UE CONTEXT MODIFICATION CONFIRM) in response to the second context update request (S604), it may initiate a context update procedure for the UE 600.

When the context update procedure for the UE 600 is initiated, the second node 62b may transmit, to a third node 61, a message (X2 SGNB MODIFICATION REQUIRED) to request the update of the UE context (S605). In response thereto, the third node 61 may transmit an RRC message (RRC Reconfiguration) for the context update to the UE 600 (S606). If an operation for the context update is performed in the UE 600 and the update is completed, the UE 600 transmits, to the third node 61, an RRC message (RRC Reconfiguration Complete) including corresponding information (S607). The third node 61 that has received the RRC message may transmit, to the second node 62b, a message (X2 SGNB MODIFICATION CONFIRM) in order to notify the completion of the update of the UE context (S608).

The second node 62b that has received, from the third node 61, information indicating that the update of the UE context has been completed may transmit, to the first node 62a, a message (UE CONTEXT MODIFICATION REQUEST) to request the update of the UE context, including an indicator indicating that has been completed (complete indicator), based on the information (S609).

In this case, the complete indicator is an indicator to notify that parameter information related to the context of the UE has been updated, and does not include information regarding to which parameter the updated context of the UE is related. Furthermore, contents related to the update of the context of the UE are included in an RRC container and transmitted from the second node to the first node through the UE CONTEXT MODIFICATION REQUEST message, but the second node cannot confirm whether the update of the UE context has been completed because it performs only a function for transmitting information included in the RRC container to the UE without analyzing the information.

Accordingly, a problem occurs in that when such a complete indicator is received after the first node makes twice context update requests, the first node is unaware that the complete indicator indicates update completion for which parameter information among the twice context requests. That is, the first node that has received the complete indicator is unaware of whether the update of context for which one of the first context update request and the second context update request has been completed. Accordingly, there is a problem in that the first node cannot determine whether to transmit a message to request the first context update again or whether to transmit a message to request the second context update again.

Referring to FIG. 6B, when the update of the context of a UE is determined to be necessary, the first node 62a may transmit a message (UE CONTEXT MODIFICATION REQUIRED-1st required) to request the update of the context to the second node 62b (S611). In response thereto, the second node 62b may transmit a confirm message (UE CONTEXT MODIFICATION CONFIRM) to the first node 62a (S612). Furthermore, when the update of parameter information different from parameter information according to the request (S611) is determined to be necessary, the first node 62a may additionally transmit a UE context update request message (UE CONTEXT MODIFICATION REQUIRED-2nd required) to the second node 62b (S613). In response thereto, the second node 62b may transmit a confirm message (UE CONTEXT MODIFICATION CONFIRM) to the first node 62a (S614).

The second node 62b that has received the request for the update of the UE context from the first node 62a may transmit, to the third node 61, a message to request the update of the UE context. In this case, as illustrated in FIG. 6B, the update request messages for the UE context (X2 SGNB MODIFICATION REQUIRED) transmitted from the second node 62b to the third node 61 may be transmitted to the third node 61 for each request triggered by the first node 62a (S615, S616).

The third node 61 may transmit an RRC message (RRC Reconfiguration) to the UE 600 in accordance with the request for the update of the UE context received from the second node 62b. Likewise, each RRC message may be transmitted in response to each UE context update request message (X2 SGNB MODIFICATION REQUIRED) received from the second node 62b (S617, S618). The UE 600 may perform the update operation of the UE context based on the RRC message received from the third node 61, and may transmit a corresponding complete message (RRC Reconfiguration complete) to the third node 61 (S619, S620).

The third node 61 may transmit, to the second node 62b, a message (X2 SGNB MODIFICATION COFIRM) to notify the completion of the context update in response to each RRC reconfiguration complete message received from the UE 600 (S621, S622). The second node 62b may transmit, to the first node 62a, a message (UE CONTEXT MODIFICATION REQUEST), including an indicator for the completion of the update of the UE context (complete indicator), in response to the reception of the message (S623, S625).

Although the UE context update request first triggered by the first node 62a and the UE context update request second triggered by the first node 62a are sequentially performed, an update procedure according to the first-triggered UE context update request may be later than an update procedure according to the second-triggered UE context update request.

If such a situation occurs, as in FIG. 6B, although the first node 62a receives, from the second node 62b, a first message to notify that the update of the UE context has been completed (S623), the first node cannot be aware that the corresponding message is related to the first request or the second request because a complete indicator included in the message does not notify an update for which parameter information.

Accordingly, as in FIG. 6B, the first node 62a cannot be aware that which UE context has been updated even after it has transmitted, to the second node 62b, a response message (UE CONTEXT MODIFICATION RESPONSE) for the message (UE CONTEXT MODIFICATION REQUEST) received from the second node 62b (S624). Furthermore, as illustrated in FIG. 6B, although a message (UE CONTEXT MODIFICATION REQUEST) to notify the completion of the update of the UE context is received from the second node (S625), the first node cannot be aware that such a message is related to the first request or the second request.

That is, after the first node 62a transmits a message to request the update of the UE context several times, although information indicating that context update has been completed is received from the second node 62b in response to the message, there is a problem in that the first node cannot be aware that context corresponding to which one of the several request messages has been update.

Particularly, as described above with reference to FIG. 5, if the update procedure of UE context fails in relation to any one of a plurality of nodes, it is unaware that which one of a plurality of requests has failed and context for which request has been updated. Accordingly, there is a problem in that a subsequent operation (e.g., an operation regarding whether to transmit a message to request the failed update of context again) of the first node cannot be defined.

Accordingly, the disclosure proposes embodiments for efficiently performing signaling for control of UE context in the state in which an NR base station configured with a CU and a DU and an LTE base station have been connected to a UE through an EN-DC structure.

More specifically, an embodiment of the disclosure proposes a method of transmitting corresponding information to a DU if the update procedure of UE context is not performed normally.

Furthermore, an embodiment of the disclosure proposes a method for a DU to confirm information on context whose update has been completed if the update of UE context has been completed based on a request for the update of the UE context.

In a first embodiment of the disclosure, a UE CONTEXT MODIFICATION REFUSE message transmitted through an interface between a DU and a CU is defined so that the DU is notified of information on the failure of the update of UE context.

In this case, the UE CONTEXT MODIFICATION REFUSE message is a message transmitted through the interface between the CU and the DU in order to notify the DU of an abnormal situation which may occur when the update procedure of the UE context is initiated after the CU receives a request message for the UE context from the DU. That is, a UE CONTEXT MODIFICATION REFUSE message according to an embodiment of the disclosure may be a message to notify a DU that the execution of a context update procedure has failed if the update procedure of UE context is determined to have failed for a given cause according to various examples described in FIG. 5.

Such a UE CONTEXT MODIFICATION REFUSE message may have included various types of information. For example, the UE CONTEXT MODIFICATION REFUSE message may include information on a UE that has failed in a context update (e.g., the ID of the UE, that is, the ID of the UE for a CU and the ID of the UE for a DU) and an RRC container to be transmitted to a UE. Furthermore, the UE CONTEXT MODIFICATION REFUSE message may further include information on a time (wait time) when a DU that has received the UE CONTEXT MODIFICATION REFUSE message can request the update of UE context whose update has failed again and count (Retry Count) information, such as how many requests for the same context are possible. Furthermore, the UE CONTEXT MODIFICATION REFUSE message may include information on a failure cause of the update of UE context (information on a cause to refuse UE CONTEXT MODIFICATION REQUIRED).

More specifically, information which may be included in a UE CONTEXT MODIFICATION REFUSE message according to an embodiment of the disclosure may be summarized as in the following table.

TABLE 2

| Information Element | Description |
| --- | --- |
| CU UE ID | Unique identifier for UE over the F1 interface within a CU |
| DU UE ID | Unique identifier for UE over the F1 interface within a DU |
| RRC Container | RRC message container which is delivered to CU |
| Wait Time | Time to wait by Modification Sender |
| Retry Count | Maximum Retry Count of Modification Sender |
| Cause | Refuse cause of modification |

Figure 7:
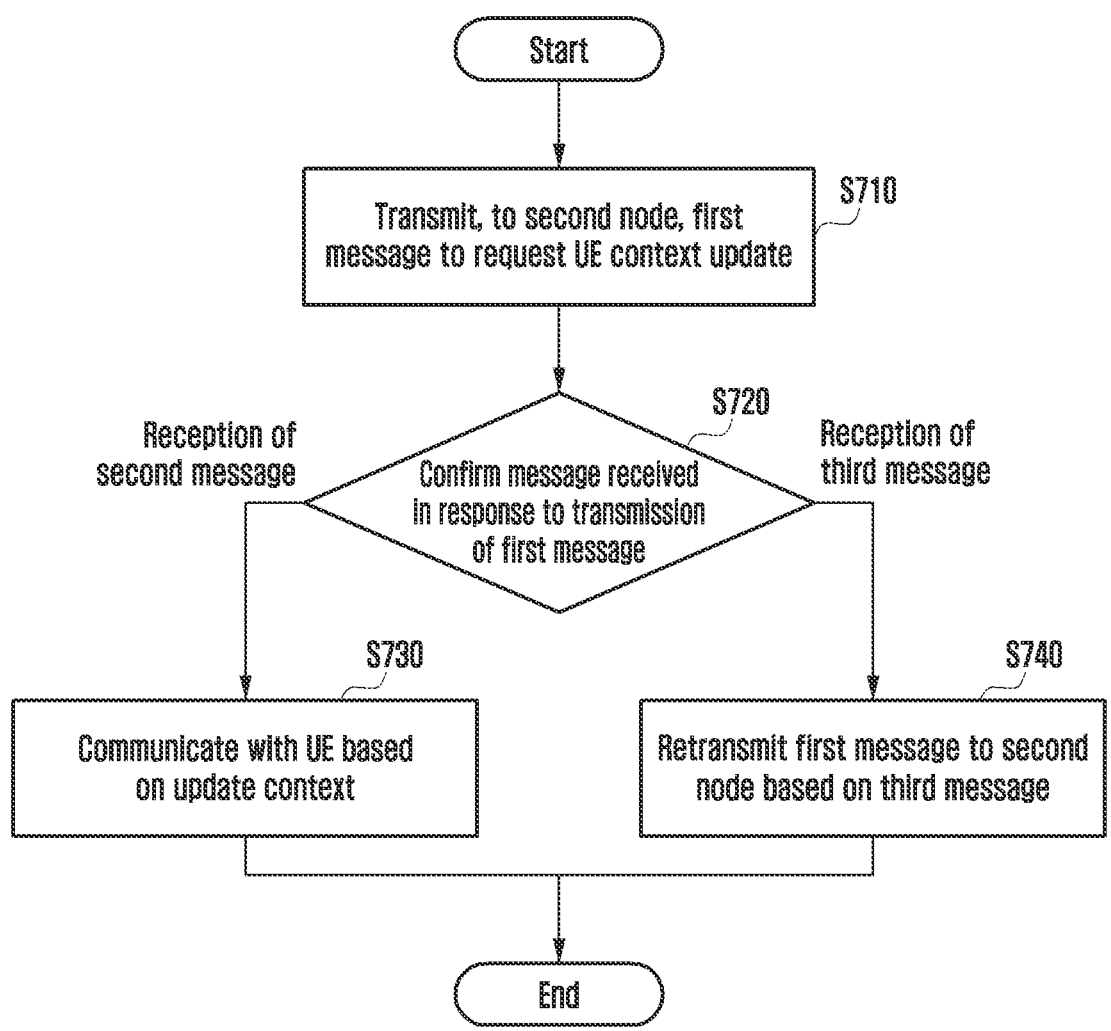
FIG. 7 is a flowchart illustrating an operation of a DU for control of UE context according to an embodiment of the disclosure.

FIG. 7 is a flowchart illustrating an operation of a DU for control of UE context according to an embodiment of the disclosure.

Figure 8:
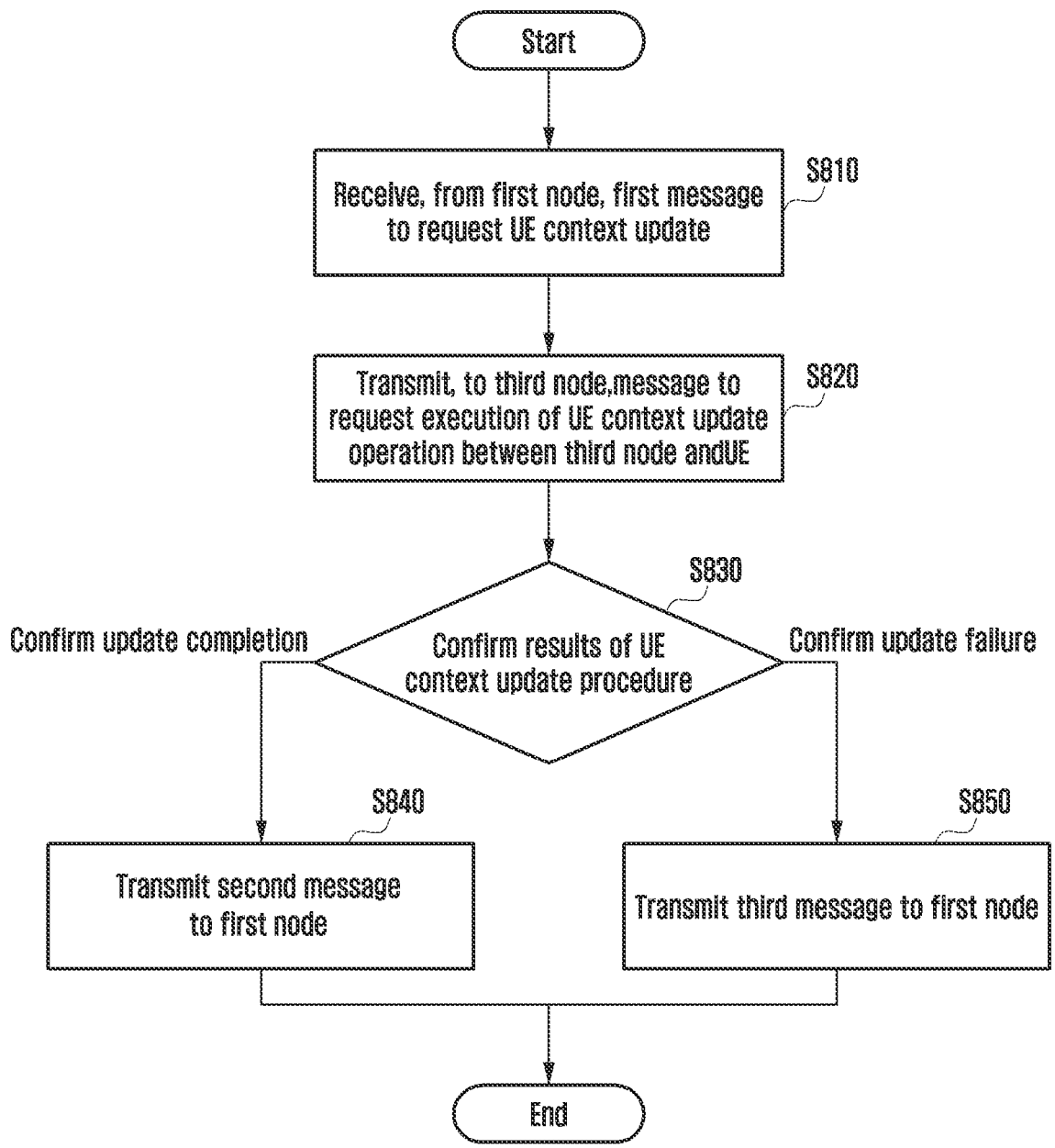
FIG. 8 is a flowchart illustrating an operation of a central unit (CU) for control of UE context according to an embodiment of the disclosure.

FIG. 8 is a flowchart illustrating an operation of a CU for control of UE context according to an embodiment of the disclosure.

Referring to FIG. 7, a first node (DU) according to an embodiment of the disclosure may detect the need for the update of some parameters according to communication while performing wireless communication with a UE. For example, the first node according to an embodiment of the disclosure may determine that a change in a parameter related to a measurement value for a cell configured in a UE is necessary or may determine that a change in a parameter related to beam characteristic information for each cell is necessary based on the results of wireless communication with the UE.

As described above, the first node may report, to a second node (CU) including an RRC layer, at least one parameter for which a change has been determined to be necessary. That is, the first node may transmit a first message to request the update of UE context related to the parameter for which a change has been determined to be necessary (S710).

In this case, the first message may be a UE CONTEXT MODIFICATION REQUIRED message transmitted through a fronthaul interface connected between the first node and the second node. The corresponding message may include the pieces of information in Table 1.

After the first message is transmitted as described above, the first node according to an embodiment of the disclosure may confirm which message is received from the second node in response to the transmission of the first message (S720).

For example, the first node may receive, from the second node, a second message to indicate the completion of the update of the UE context in response to the transmission of the first message. In this case, the second message to indicate the completion of the update of the UE context may be a UE CONTEXT MODIFICATION REQUEST message transmitted through the fronthaul interface, for example.

A second message according to an embodiment of the disclosure may include information (e.g., a complete indicator) to indicate update completion for requested UE context as described above with reference to FIGS. 6A and 6B. That is, the second message according to an embodiment of the disclosure may include information on a UE or information, such as which UE context has been updated if a plurality of UE context update requests has been made for a plurality of UEs.

When the second message is received as described above, the first node according to an embodiment of the disclosure may perform wireless communication with the UE based on UE context whose update has been completed (S730).

Furthermore, for example, the first node may receive, from the second node, a third message to indicate the failure of the update of the UE context in response to the transmission of the first message. In this case, the third message to indicate the failure of the update of the UE context may be a UE CONTEXT MODIFICATION REFUSE message transmitted through a fronthaul interface, for example.

A third message according to an embodiment of the disclosure may include information on a corresponding procedure failed due to what cause by which node during a procedure of updating UE context, which is performed between a UE and a second node and the third node. For example, the third message may include information, such as that the third node has failed in a corresponding procedure after a request message for the update of UE context for initiating the update procedure of the UE context is transmitted from the second node to the third node or that a UE that has received the indication of the update procedure of UE context from the third node has failed in the corresponding procedure while performing the update of the corresponding context.

Furthermore, the third message according to an embodiment of the disclosure may include the pieces of information in Table 2 as described above. That is, the third message may include the ID of a UE for a first node and a second node or information, such as when and how many times a first message for requesting the update of corresponding UE context can be transmitted.

When the third message is received, the first node according to an embodiment of the disclosure may transmit, to the second node, the first message for requesting the update of the UE context based on information included in the third message again (S740).

Referring to FIG. 8, a second node (CU) according to an embodiment of the disclosure may receive, from a first node (DU), a first message to request the update of UE context (S810).

When the first message is received, the second node according to an embodiment of the disclosure may initiate the update procedure of the UE context. For example, the second node according to an embodiment of the disclosure may transmit, to a third node, a message to request the execution of the update operation of the UE context between the third node and a UE (S820).

When the message is transmitted from the second node to the third node as described above, the third node may perform the update operation of the UE context between the third node and the UE. For example, the third node may indicate the update operation of the UE context for the UE using an RRC message. The UE may perform the update operation of the UE context based on the indication. Furthermore, the UE may transmit, to the third node, an RRC message including corresponding result information as a response.

The third node may transmit, to the second node, result information for the update operation of the UE context between the third node and the UE. For example, if the update operation of the UE context fails in the third node or the UE due to a given cause, the third node may transmit, to the second node, a message (REFUSE message) including corresponding information through an X2 interface. Furthermore, when the update operation of the UE context is successfully completed, the third node may transmit, to the second node, a message (CONFIRM message) including corresponding information through the X2 interface.

After initiating the update procedure of the UE context, the second node according to an embodiment of the disclosure may confirm the results of the update procedure of the UE context based on a message received from the third node (S830).

For example, when the completion of the update of the UE context is confirmed based on a CONFIRM message received from the third node, the second node may transmit, to the first node, a second message to request the update of the corresponding UE context (S840). In this case, the second message may be a UE CONTEXT MODIFICATION REQUEST message transmitted through a fronthaul interface between the first node and the second node.

For another example, when the failure of the update of the UE context is confirmed based on a REFUSE message received from the third node, the second node may transmit, to the first node, a third message to notify the failure of the update of the corresponding UE context (S850). In this case, the third message may be a UE CONTEXT MODIFICATION REFUSE message transmitted through the fronthaul interface, including information received from the third node or corresponding information if the update of the corresponding UE context fails in the second node due to a given cause.

As described above, after the update of UE context is requested, a DU according to an embodiment of the disclosure can rapidly determine whether to request the update procedure of the corresponding UE context to be initiated again based on information included in a message received from a CU or whether the DU has to perform wireless communication with a UE based on updated context. Particularly, if the update of UE context has been successfully completed, a CU according to an embodiment of the disclosure transmits information, such as that the update of which UE context has been completed, and provides a DU with a failure cause if the update of UE context has failed and information related to an operation for recovering the failure. Accordingly, there is an effect in that the update procedure of UE context can be more efficiently performed without delay.

FIGS. 9 to 13 are flowcharts for describing examples in which a CU transmits, to a DU, a REFUSE message according to embodiments of the disclosure in various cases where the update procedure of UE context fails according to various embodiments of the disclosure.

Figure 9:
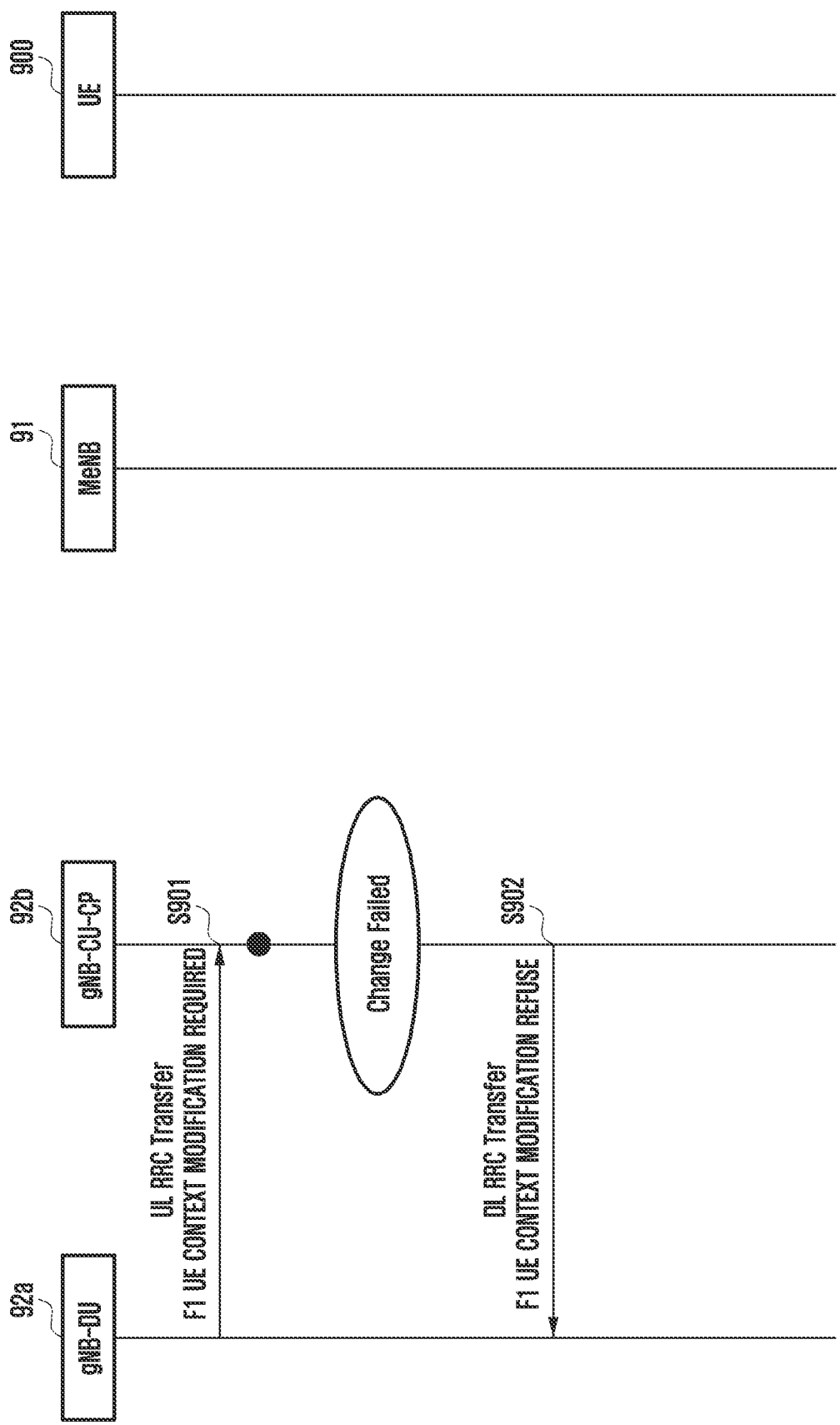
FIG. 9 is a flowchart for describing an example in which a CU transmits, to a DU, a REFUSE message according to an embodiment of the disclosure in various cases where the update procedure of UE context fails according to an embodiment of the disclosure.

Referring to FIG. 9, when the update of UE context is determined to be necessary, a first node 92a may transmit, to a second node 92b, a message (UE CONTEXT MODIFICATION REQUIRED) to request the update of the UE context (S901). When the message is received from the first node 92a, the second node 92b may initiate the update procedure of the UE context based on the received message. For reference, FIG. 9 further illustrates a third node 91 and UE 900.

Referring to FIG. 9, an abnormal situation may occur in the operation for the second node 92b to initiate the update procedure of the UE context. For example, the update procedure of the UE context may not be initiated due to a problem, such as that the second node 92b fails in the reception of a UE CONTEXT MODIFICATION REQUIRED message from the first node 92a.

If the update procedure of the UE context is not initiated as described above, the second node 92b according to an embodiment of the disclosure may transmit, to the first node 92a, a UE CONTEXT MODIFICATION REFUSE message in order to notify the first node 92a that the update procedure of the UE context has not been initiated (S902). For example, the UE CONTEXT MODIFICATION REFUSE message may include information on a UE context procedure failure attributable to a reception failure in the second node 92b.

The first node 92a that has received the REFUSE message as described above can rapidly confirm that the procedure requested from the second node 92b has failed. Accordingly, the first node may subsequently transmit an update request for the same context to the second node 92b again.

Figure 10:
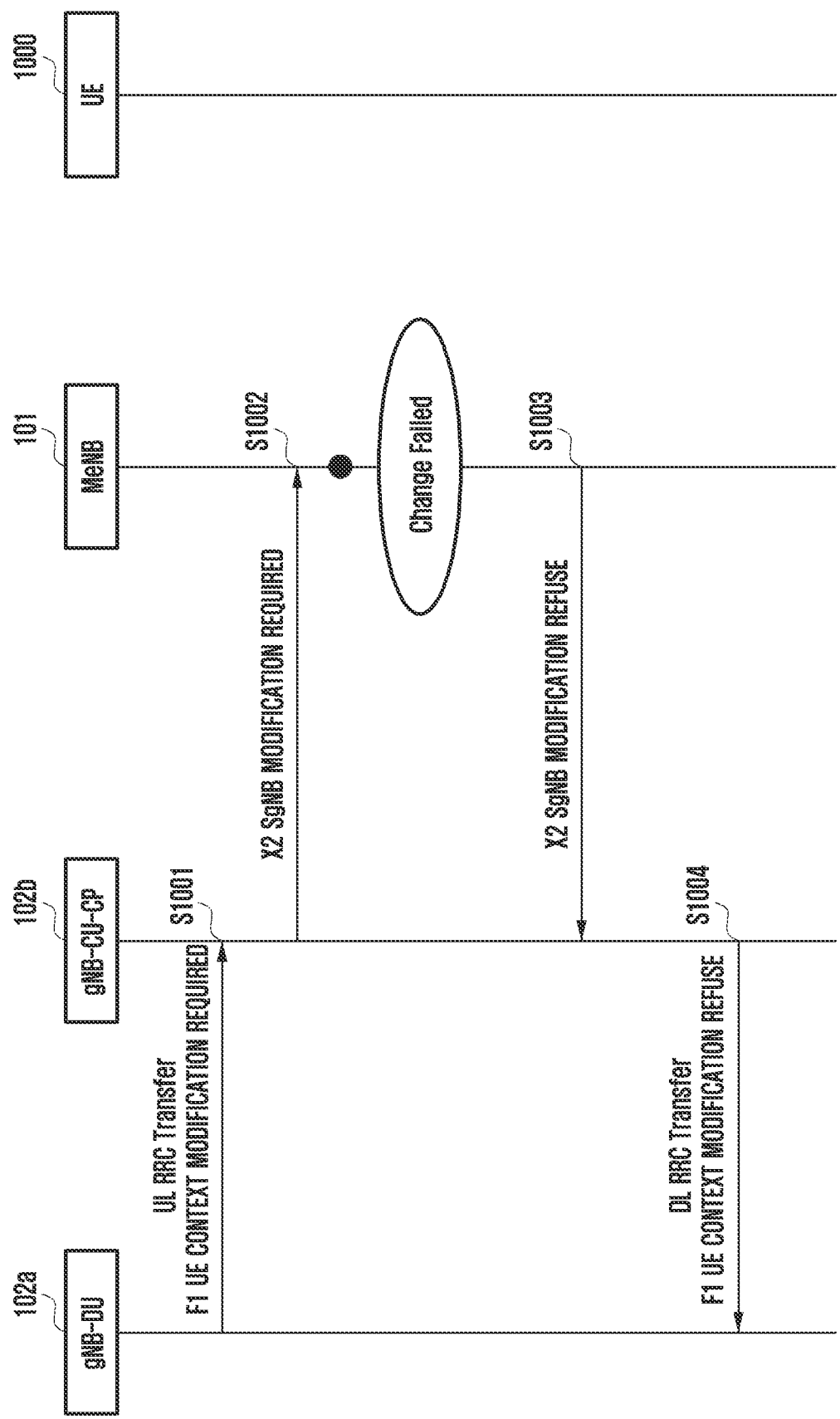
FIG. 10 is a flowchart for describing an example in which a CU transmits, to a DU, a REFUSE message according to an embodiment of the disclosure in various cases where the update procedure of UE context fails according to an embodiment of the disclosure.

Referring to FIG. 10, when the update of UE context is determined to be necessary, a first node 102a may transmit, to a second node 102b, a message (UE CONTEXT MODIFICATION REQUIRED) to request the update of the UE context (S1001). When the message is received from the first node 102a, the second node 102b may initiate the update procedure of the UE context based on the received message. That is, the second node 102b may transmit, to a third node 101, a message (X2 UE CONTEXT MODIFICATION REQUIRED) to request the update of the UE context based on the request message received from the first node 102a (S1002).

The third node 101 needs to transmit, to a UE 1000, an RRC message for the execution of the context update in response to the UE context update request received from the second node 102b, but an abnormal situation may occur prior to the execution of a corresponding operation as illustrated in FIG. 10. For example, a problem, such as that the third node 101 fails in the reception of the X2 SGNB MODIFICATION REQUIRED message or does not transmit a corresponding RRC message to the UE 1000, may occur.

In this case, the third node 101 may transmit, to the second node 102*b*, a message (X2 SGNB MODIFICATION REFUSE) to notify that the update procedure of the UE context has failed through an X2 interface (S1003).

In response thereto, the second node 102*b* that has received the message, including information on the failure of the update of the UE context, from the third node 101 may transmit, to the first node 102*a*, a REFUSE message according to an embodiment of the disclosure (S1004). The first node 102*a* may determine whether to transmit a message to request the update of the corresponding context again based on the reception of the REFUSE message from the second node 102*b*. For example, after a given time (wait time) expires, the first node 102*a* may transmit, to the second node 102*b*, a message to request the update of the context based on the REFUSE message.

Figure 11:
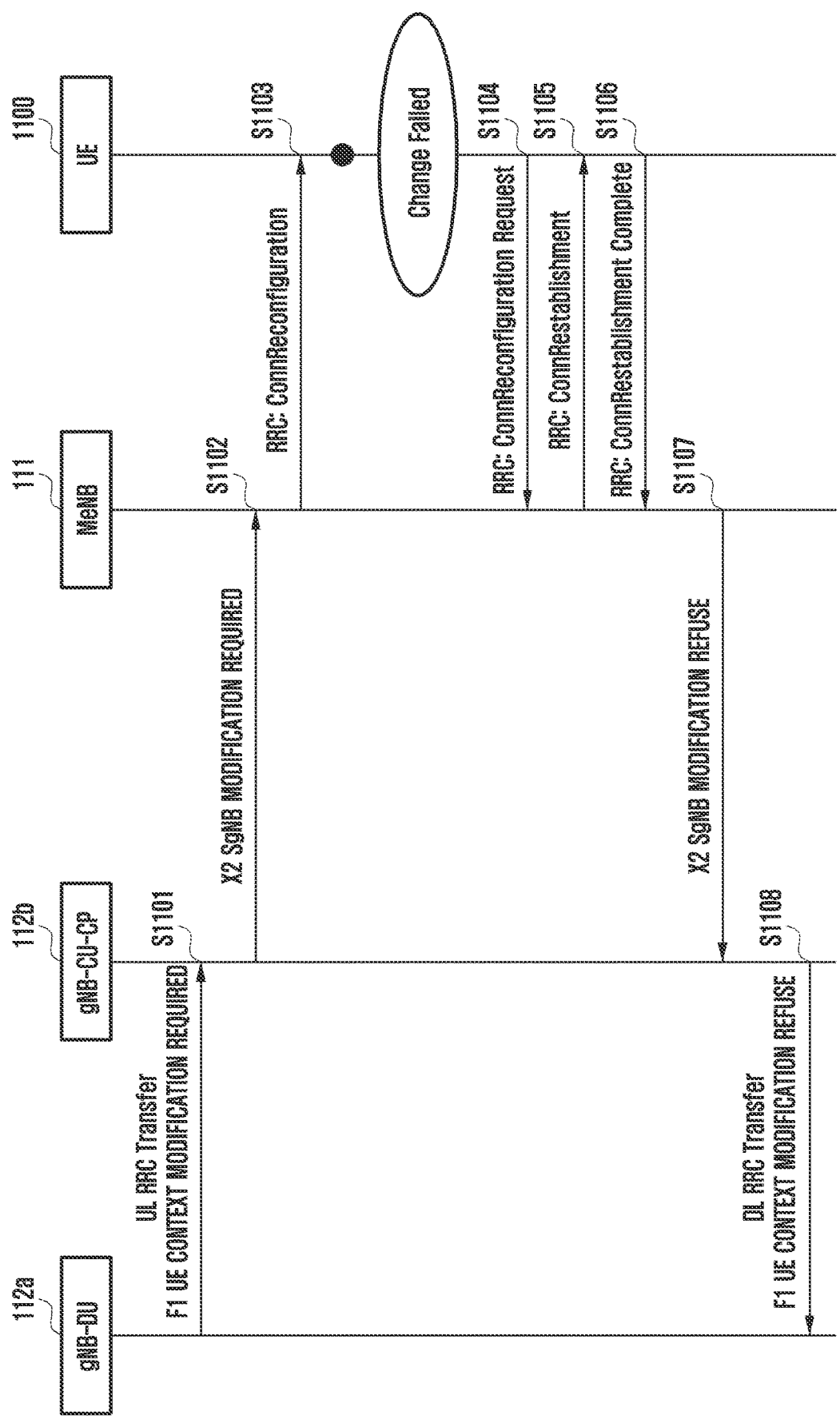
FIG. 11 is a flowchart for describing an example in which a CU transmits, to a DU, a REFUSE message according to an embodiment of the disclosure in various cases where the update procedure of UE context fails according to an embodiment of the disclosure.

Referring to FIG. 11, when the update of UE context is determined to be necessary, a first node 112*a* may transmit, to a second node 112*b*, a message (UE CONTEXT MODIFICATION REQUIRED) to request the update of the UE context (S1101). When the message is received from the first node 112*a*, the second node 112*b* may transmit, to a third node 111, a message (X2 SGNB MODIFICATION REQUIRED) to request the update of the UE context based on the received message (S1102).

The third node 111 may transmit, to a UE 1100, an RRC message for the execution of the context update in response to the UE context update request received from the second node 112*b* (S1103). The UE 1100 may initiate an operation for updating the context based on the RRC message received from the third node 111. In this case, the reception of the RRC message may fail or the context update procedure may fail due to a cause, such as a wireless communication situation.

In this case, the UE 1100 transmits, to the third node 111, an RRC message (RRC ConnReconfiguration request) for the connection reconfiguration of the third node 111 (S1104). In response thereto, the UE 1100 reconfigures an RRC connection with the third node 111 based on a message (RRC ConnReestablishment) received from the third node 111 (S1105). When the RRC connection is reconfigured, the UE 1100 may transmit, to the third node 111, a message (RRC ConnReestablishment Complete) to notify RRC connection reconfiguration completion (S1106).

In this case, the UE 1100 has reconfigured the RRC connection with the third node 111 as described above, but has not performed the update operation of the UE context triggered by the first node 112*a*. Accordingly, after the third node 111 receives the reconfiguration complete message for the RRC connection, it may transmit, to the second node 112*b*, a message (X2 SGNB MODIFICATION REFUSE) to notify that the update of the UE context has failed (S1107).

In response thereto, the second node 112*b* may transmit, to the first node 112*a*, a message (UE CONTEXT MODIFICATION REFUSE) to notify the failure of the update of the UE context (S1108). When the REFUSE message is received from the second node 112*b*, the first node 112*a* according to an embodiment of the disclosure determines whether to request the context update again based on the REFUSE message. For example, the first node 112*a* may determine whether to perform the transmission of the message to request the update of the corresponding context again based on a comparison between an update failure count for the corresponding context and retry count information included in the REFUSE message.

Figure 12:
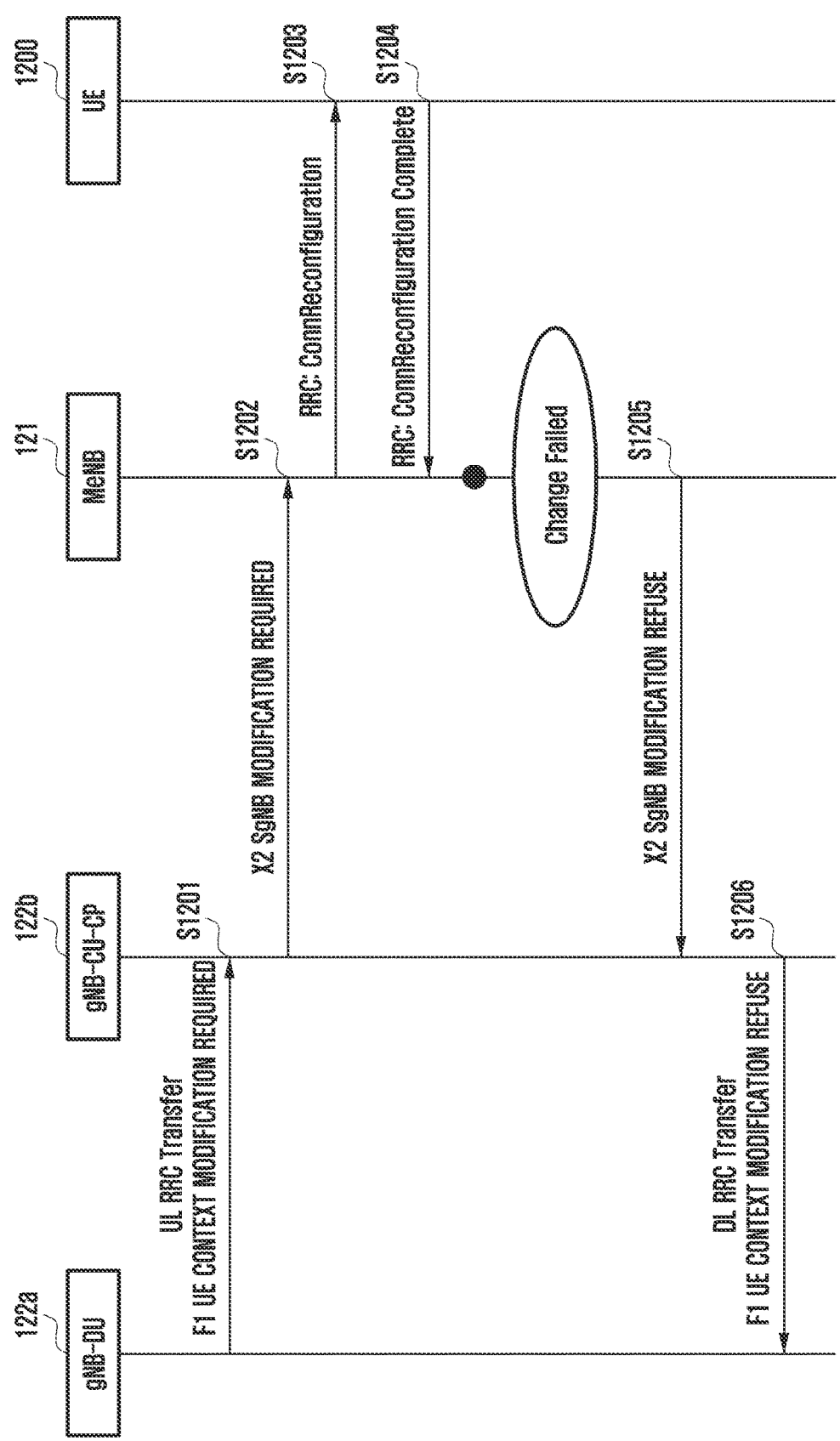
FIG. 12 is a flowchart for describing an example in which a CU transmits, to a DU, a REFUSE message according to an embodiment of the disclosure in various cases where the update procedure of UE context fails according to an embodiment of the disclosure.

Referring to FIG. 12, when the update of UE context is determined to be necessary, a first node 122*a* may transmit, to a second node 122*b*, a message (UE CONTEXT MODIFICATION REQUIRED) to request the update of the UE context (S1201). When the message is received from the first node 122*a*, the second node 122*b* may transmit, to a third node 121, a message (X2 SGNB MODIFICATION REQUIRED) to request the update of the UE context (S1202). The third node 121 may transmit, to a UE 1200, an RRC message for the execution of the context update in response to the UE context update request received from the second node 122*b* (S1203). The UE 1200 may initiate an operation for updating the context based on the RRC message received from the third node 121. Furthermore, when the context update operation is completed, the UE 1200 may transmit, to the third node 121, an RRC message (RRC ConnReconfiguration Complete) including corresponding information (S1204).

An abnormal situation may occur while the third node 121 performs an operation for notifying the second node 122*b* of the completion of the update of the UE context based on the RRC message received from the UE 1200. In this case, the third node 121 may transmit, to the second node 122*b*, an REFUSE message (X2 SGNB MODIFICATION REFUSE) including information indicating that the update of the UE context has failed (S1205).

The second node 122*a* that has received X2 SGNB MODIFICATION REFUSE from the third node 121 as described above may transmit, to the first node 122*a*, a message (UE CONTEXT MODIFICATION REFUSE) to notify that the update of the UE context has failed (S1206). The first node 122*a* may determine whether to retransmit a message to request the update of the UE context based on the received message.

Figure 13:
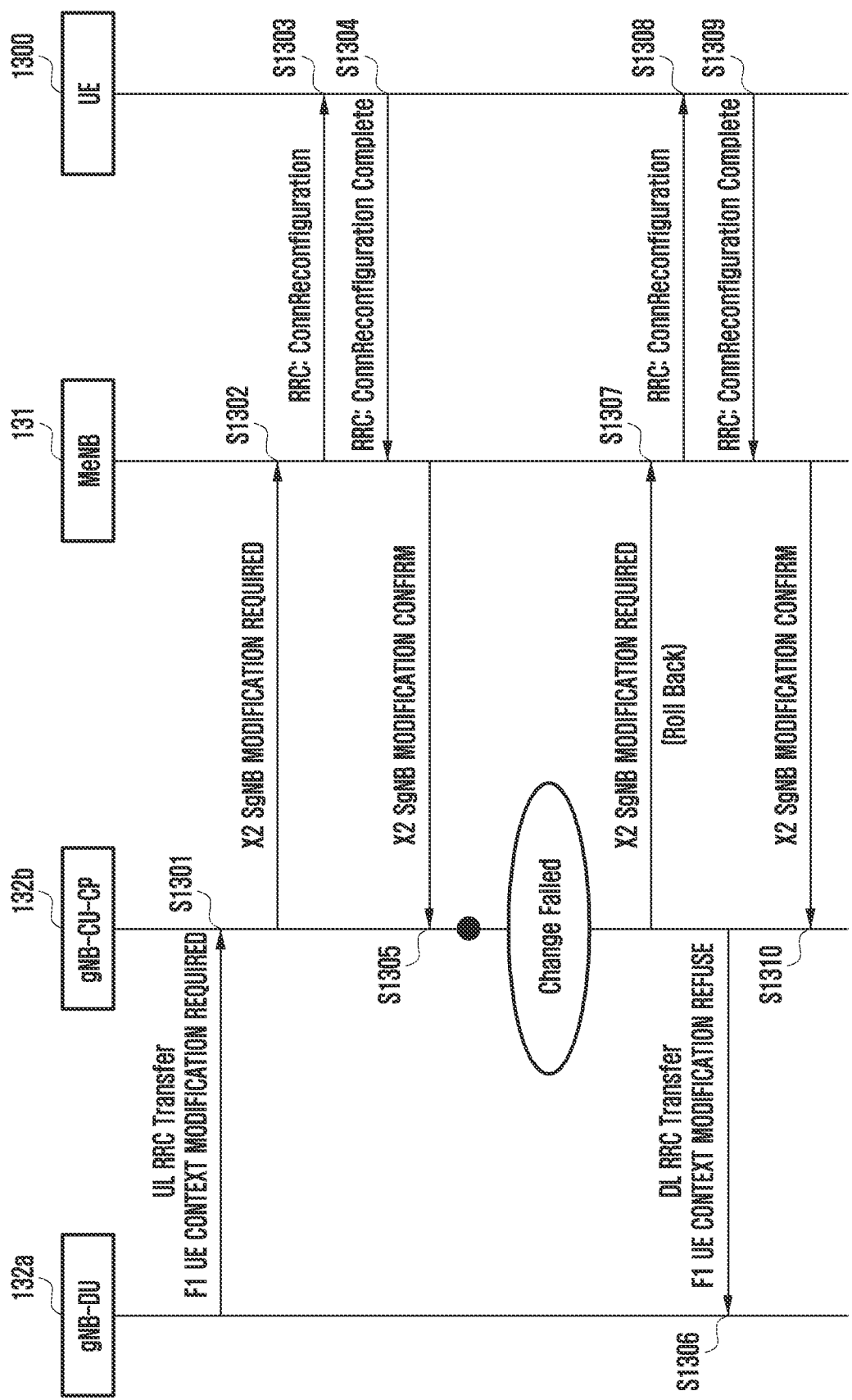
FIG. 13 is a flowchart for describing an example in which a CU transmits, to a DU, a REFUSE message according to an embodiment of the disclosure in various cases where the update procedure of UE context fails according to an embodiment of the disclosure.

Referring to FIG. 13, when the update of UE context is determined to be necessary, a first node 132*a* may transmit, to a second node 132*b*, a message (UE CONTEXT MODIFICATION REQUIRED) to request the update of the UE context (S1301). When the message is received from the first node 132*a*, the second node 132*b* may transmit, to a third node 131, a message (X2 SGNBMODIFICATION REQUIRED) to request the update of the UE context based on the received message (S1302).

The third node 131 may transmit, to a UE 1300, an RRC message for the execution of the context update in response to the UE context update request received from the second node 132*b* (S1303). The UE 1300 may initiate an operation for updating the context based on the RRC message received from the third node 131. Furthermore, when the context update operation is completed, the UE 1300 may transmit, to the third node 131, an RRC message (RRC ConnReconfiguration Complete) including corresponding information (S1304).

The third node 131 may transmit, to the second node 132*b*, a message (X2 SGNB MODIFICATION CONFIRM) for notifying the completion of the update of the UE context based on the RRC message received from the UE 1300 (S1305). In this case, a situation, such as the failure of the execution of the update procedure of the UE context or the impossible execution of the update procedure attributable to a given cause although the second node 132*b* has received the message, may occur.

In this case, the second node 132*b* may transmit, to the first node 132*a*, a message (UE CONTEXT MODIFICATION REFUSE) to notify the failure of the update procedure of the UE context (S1306). Furthermore, the second node 132*b* may transmit, to the third node 131, a message (X2 SGNB MODIFICATION REQUIRED) including a roll back indicator to indicate the cancellation of a corresponding context update procedure due to the failure of the corresponding context update (S1307).

The third node 131 may transmit, to the UE 1300, an RRC message including information for rolling the updated corresponding context back based on the X2 SGNB MODIFICATION REQUIRED message (S1308). After performing an operation for rolling the UE context back, the UE 1300 may transmit, to the third node, a message (RRCConnReconfiguration Complete) to notify the corresponding completion (S1309).

When the RRCConnReconfiguration complete message is received from the UE, the third node 131 may transmit, to the second node 132b, a message (X2 SGNB MODIFICATION CONFIRM) including corresponding information (S1310).

In FIGS. 9 to 13, in addition to an embodiment related to the transmission of a REFUSE message attributable to the failure of a UE context procedure for any one node, the REFUSE message may be used for various causes.

For example, if a UE CONTEXT MODIFICATION REQUIRED message is received from a DU with respect to a given UE while a handover procedure for the same UE is performed, a CU may refuse a corresponding request using the UE CONTEXT MODIFICATION REFUSE message. For another example, although a CU has transmitted a UE CONTEXT MODIFICATION REQUEST message to a DU with respect to a given UE, if the DU transmits a UE CONTEXT MODIFICATION REQUIRED message again, the CU may refuse the corresponding request using a UE CONTEXT MODIFICATION REFUSE message based on a session for the UE CONTEXT MODIFICATION REQUEST that is previously in progress.

A second node according to an embodiment of the disclosure may notify that the update of UE context cannot be now performed using a UE CONTEXT MODIFICATION REFUSE message in a given situation although the update of the UE context does not fail.

Figure 14:
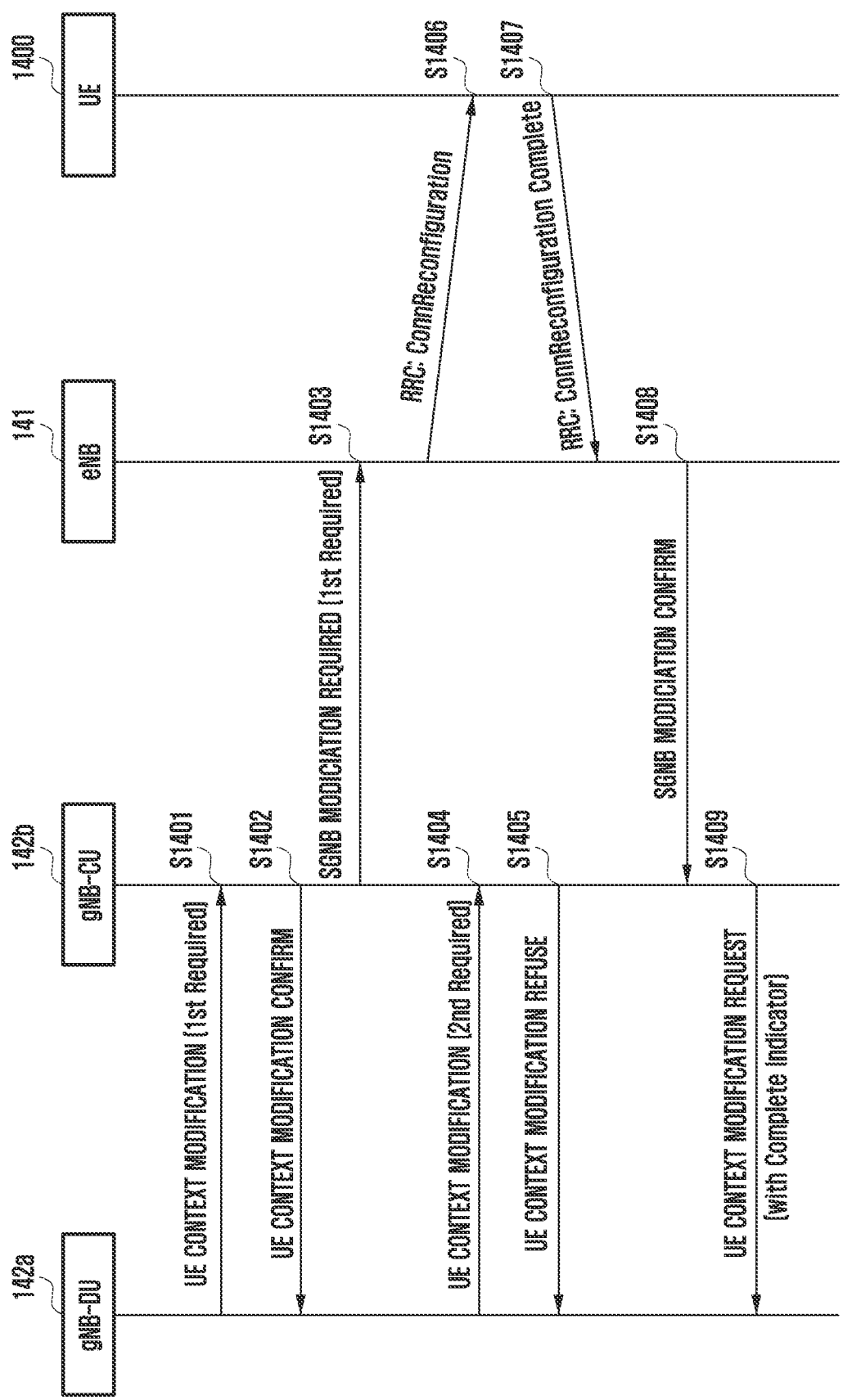
FIG. 14 is a diagram illustrating an example in which a CU transmits, to a DU, a REFUSE message according to an embodiment of the disclosure in a given situation according to an embodiment of the disclosure.
Figure 15:
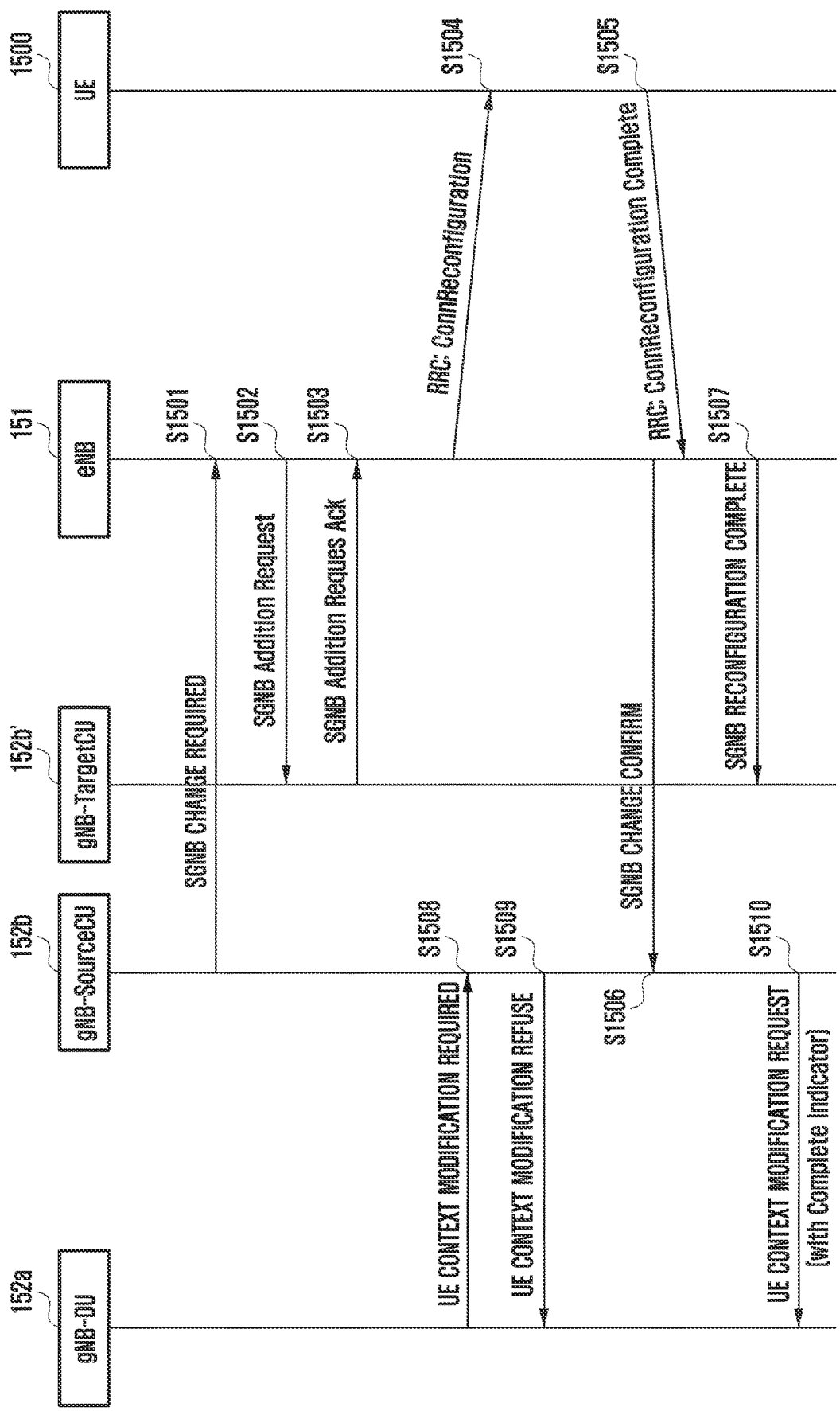
FIG. 15 is a diagram illustrating an example in which a CU, to a DU, a REFUSE message according to an embodiment of the disclosure in a handover situation according to an embodiment of the disclosure.

FIGS. 14 and 15 are diagrams illustrating examples in which a CU transmits, to a DU, a REFUSE message according to embodiments of the disclosure in a given situation according to various embodiments of the disclosure.

Referring to FIG. 14, when the update of UE context is determined to be necessary, a first node 142a according to an embodiment of the disclosure may transmit, to a second node 142b, a message (UE CONTEXT MODIFICATION REQUIRED—1st required) to request the update of the UE context (S1401). The second node 142b may transmit, to the first node 142a, a message (UE CONTEXT MODIFICATION CONFIRM) for confirming the reception of the message (S1402). Furthermore, the second node 142b according to an embodiment of the disclosure may transmit, to a third node 141, a message (SGNB CONTEXT MODIFICATION REQUIRED—1st required) for the update of the UE context in response to the request (S1403).

After the first request, the first node 142a according to an embodiment of the disclosure may additionally transmit, to the second node 142b, a request for another UE context (UE CONTEXT MODIFICATION REQUIRED—2nd required) (S1404). In response thereto, the second node 142b according to an embodiment of the disclosure may transmit a REUSE message (UE CONTEXT MODIFICATION REFUSE) to the first node 142a (S1405).

That is, unlike in a technology of the related art in which only the confirmation of reception is simply performed through a CONFIRM message, the second node 142b according to an embodiment of the disclosure uses the REFUSE message in a given situation in which the update procedure of UE context cannot be initiated. Accordingly, there is an effect in that an ambiguous situation in which the first node cannot be aware of whether the update procedure of UE context is in progress can be solved.

In response to the first request of the UE context, pieces of signaling for the context update are transmitted and received between the third node 141 and a UE 1400 (S1406, S1407). The third node 141 may transmit, to the second node 142b, a message (SGNB MODIFICATION CONFIRM) including result information according to the signaling (S1408). The second node 142b may transmit, to the first node 142a, a message (UE CONTEXT MODIFICATION REQUEST) including information (complete indicator) indicating that the update of the UE context has been completed based on the message (S1409).

Referring to FIG. 15, the second node according to an embodiment of the disclosure may determine that handover is necessary. Hereafter, the existing second node is named a second source node, and a second node that is a target of handover is named a second target node.

A second source node 152b according to an embodiment of the disclosure may transmit, to a third node 151, signaling (SGNB CHANGE REQUIRED) for a handover procedure trigger (S1501). The third node 151 that has received the signaling may trigger a new call setup procedure by transmitting an SGNB Addition Request message to a second target node 152b' (S1502). When all call setups are completed, the second target node 152b' may transmit an SGNB Addition Request Ack message to the third node 151 according to an embodiment of the disclosure (S1503).

When the SGNB Addition Request Ack message is received, the third node 151 may transmit signaling for an RRC reconfiguration to a UE 1500 (S1504). In response thereto, the UE 1500 may transmit an RRC complete message to the third node 151 (S1505), so an RRC reconfiguration procedure may be performed. The third node 151 according to an embodiment of the disclosure transmits an SGNB CHANGE CONFIRM message to a second source node 152b in response to the completion of the RRC reconfiguration procedure (S1506), and transmits an SGNB RECONFIGURATION COMPLETE message to the second target node 152b' (S1507). In this case, after receiving the SGNB CHANGE CONFIRM message, the second source node 152b may request an operation necessary because a belonging SgNB of the UE managed by the first source node is changed by transmitting, to the first node 152a, a UE CONTEXT MODIFICATION REQUEST message including a Complete Indicator (S1510). The corresponding necessary operation includes Data Forwarding to the target node and corresponding source-side UE context release. Accordingly, the SgNB Change procedure for the corresponding UE can be completed.

The first node 152a according to an embodiment of the disclosure may transmit a message (UE CONTEXT MODIFICATION REQUIRED) to request the update of UE context in the state in which the first node is unaware of a handover situation between the second source node 152b and the second target node 152b' (S1508). In this case, the second source node 152b may determine that the update of the UE context is impossible in the state in which handover is in progress, and may transmit, to the first node 152a, an F1 UE CONTEXT MODIFICATION REFUSE message according to an embodiment of the disclosure (S1509). Accordingly, the first node 152a can confirm that the update of the UE context cannot be performed.

In the drawings, embodiments in which a CU transmits, to a DU, a REFUSE message notifying the failure of the context update procedure of a UE have been described. However, according to an embodiment of the disclosure, a CU may transmit a message to notify that the progress of the context procedure of a UE has been suspended.

For example, if the context update procedure of a UE cannot be performed, a CU according to an embodiment of the disclosure may transmit, to a DU, a UE CONTEXT MODIFICATION SUSPEND message for transmitting corresponding information. In this case, the DU can be aware that the update of the corresponding context has been suspended until a UE CONTEXT MODIFICATION RESUME message to notify the progress (or resumption) of the context update procedure of the UE is received from the CU. Accordingly, a DU according to an embodiment of the disclosure may not perform a separate re-request although a message to notify that the update of corresponding context has been successfully completed is not received for a given time.

Figure 16:
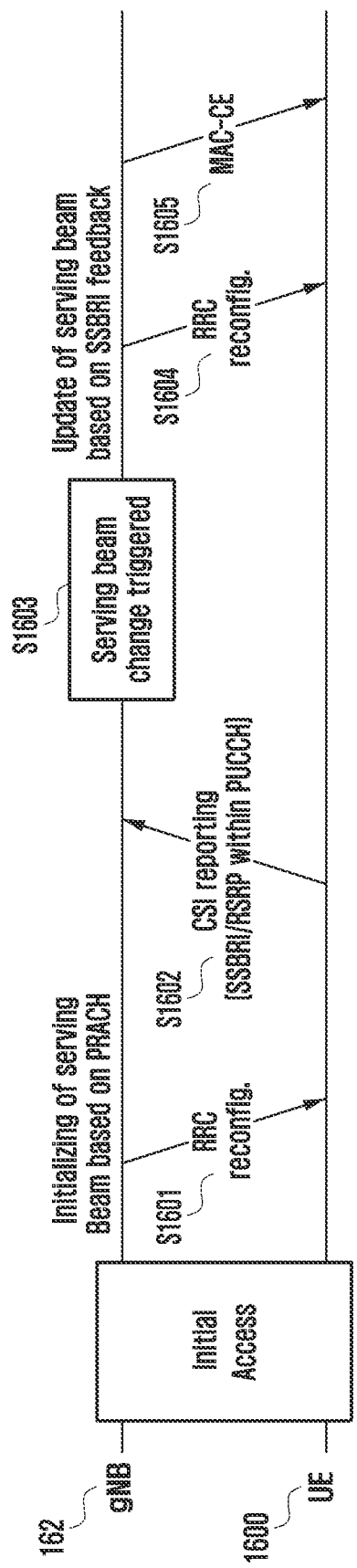
FIG. 16 is a diagram illustrating an example in which a base station whose CU and DU have been separated performs the update of UE context according to an embodiment of the disclosure.

FIG. 16 is a diagram illustrating an example in which a base station whose CU and DU have been separated performs the context update of a UE according to an embodiment of the disclosure.

Referring to FIG. 16, an NR base station (gNB) 162 according to an embodiment of the disclosure may initiate a serving beam based on a physical random access channel (PRACH) transmitted by a UE 1600 that has performed initial access to the NR base station 162, and may transmit, to the UE 1600, an RRC reconfiguration message including configuration information related to an RRC connection with the UE 1600 (S1601). Furthermore, the NR base station (gNB) 162 may receive, from the UE 1600, CSI reporting information based on the RRC reconfiguration message (S1602). In this case, the CSI reporting information may include a synchronization signal block rank indicator (SSBRI), reference signal received power (RSRP), etc.

The NR base station 162 may determine that a modification of beam-related UE context is necessary based on the CSI reporting information received from the UE 1600. For example, the NR base station 162 according to an embodiment of the disclosure may determine that a modification of UE context information related to parameters that are included in Table 3 and that are related to beam control of a MAC layer.

TABLE 3

| RRC IEs | | Description |
| --- | --- | --- |
| nzp_CSI_RS_Resource | qcl_InfoPeriodicCSI_RS | For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to. Corresponds to L1 parameter 'QCL-Info-PeriodicCSI-RS' (see 38.214, section 5.2.2.3.1) |
| csi_ResourceConfig | csi_RS_ResourceConfigId | Used in CSI-ReportConfig to refer to an instance of CSI-ResourceConfig |
| | csi_SSB_ResourceSetList | Contains up to maxNrofNZP-CSI-RS-ResourceSetsPerConfig resource sets if ResourceConfigType is 'aperiodic' and 1 otherwise. Corresponds to L1 parameter 'ResourceSetConfigList' (see 38.214, section 5.2.1.3.1) |
| | bwp_Id | The DL BWP which the CSI-RS associated with this CSI-ResourceConfig are located in. Corresponds to L1 parameter 'BWP-Info' (see 38.214, section 5.2.1.2 |
| | resourceType | Time domain behavior of resource configuration. Corresponds to L1 parameter 'ResourceConfigType' (see 38.214, section 5.2.2.3.5). It does not apply to resources provided in the csi-SSB-ResourceSetList. |
| csi_SSB_ResourceSetTo-AddMod | | Pool of CSI-SSB-ResourceSet which can be referred to from CSI-ResourceConfig |
| srs_Config | | The SRS-Config IE is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI). |
| tci_StatesPDCCH_ToAddList | | A subset of the TCI states defined in pdsch-Config. They are used for providing QCL relationships between the DL RS(s) in one RS Set (TCI-State) and the PDCCH DMRS ports. Corresponds to L1 parameter 'TCI-StatesPDCCH' (see 38.213, section10.). The |

TABLE 3-continued

| RRC IEs | Description |
| --- | --- |
| pdsch_tciStatesToAddModList | network configures at most maxNrofTCI-StatesPDCCH entries.<br>A list of Transmission Configuration Indicator (TCI) states indicating a transmission configuration which includes QCL-relationships between the DL RSs in one RS set and the PDSCH DMRS ports (see 38.214, section 5.1.4). |
| pucch_spatialRelationInfo-ToAddModList | Configuration of the spatial relation between a reference RS and PUCCH. Reference RS can be SSB/CSI-RS/SRS. If the list has more than one element, MAC-CE selects a single element (see TS 38.321, section FFS_Section and TS 38.213, section 9.2.2). |
| radioLinkMonitoringConfig | The RadioLinkMonitoringConfig IE is used to configure radio link monitoring for detection of beam-and/or cell radio link failure. See also 38.321, section 5.1.1 |
| CSI_ReportConfig for BM | The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See 38.214, section 5.2.1. |

The DU of the NR base station 162 according to an embodiment of the disclosure may transmit, to the CU of the NR base station 162, a UE CONTEXT MODIFICATION REQUEST message including UE context information for a given parameter that belongs to the parameters of RRC IEs included in Table 3 and for which updates are necessary through communication with the UE 1600.

For example, when the update of UE context related to csi_ResourceConfig among beam control-related parameters is determined to be necessary, the DU of the NR base station 162 may transmit a corresponding request message to the CU of the NR base station 162. Furthermore, after the request message is transmitted, if the update of the UE context related to CSI_ReportConfig for BM is determined to be necessary, the DU of the NR base station 162 may transmit, to the CU of the NR base station 162, a message to request the update of the corresponding UE context independently of the request message.

The CU of the NR base station 162 that has received the UE context update request from the DU of the NR base station 162 as described above may perform a UE context update procedure according to an embodiment of the disclosure. Furthermore, the CU of the NR base station 162 may transmit, to the DU of the NR base station 162, result information indicating whether a serving beam for the UE 1600 has been changed (s1603).

Referring to FIG. 16, if a UE context update related to the serving beam for the UE 1600 is confirmed, the NR base station 162 according to an embodiment of the disclosure may perform wireless communication with the UE according to the updated serving beam based on the SSBRI feedback of the UE 1600.

For example, the NR base station 162 according to an embodiment of the disclosure may transmit an RRC reconfiguration message (S1604) or transmit an MAC-control element (CE) (S1605) to the UE 1600 based on the updated serving beam.

Figure 17:
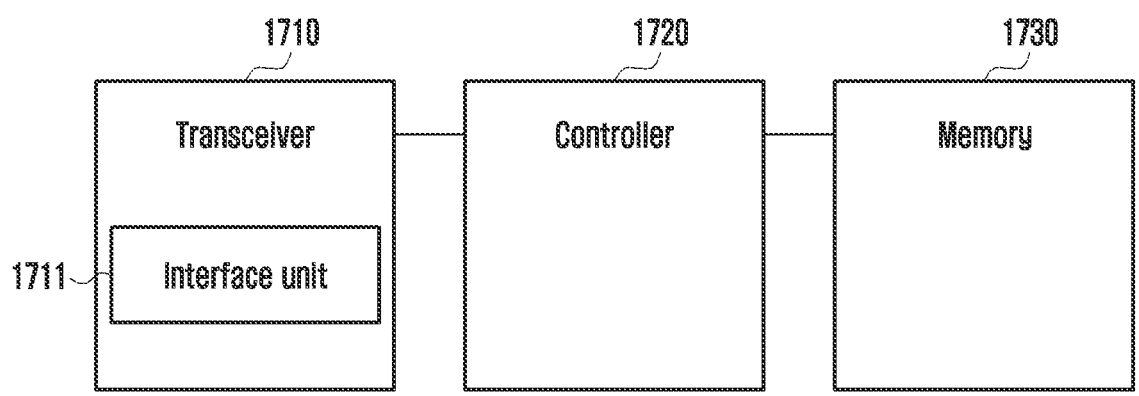
FIG. 17 is a diagram illustrating the configuration of a base station according to an embodiment of the disclosure.

FIG. 17 is a diagram illustrating the configuration of a base station according to an embodiment of the disclosure.

Figure 18:
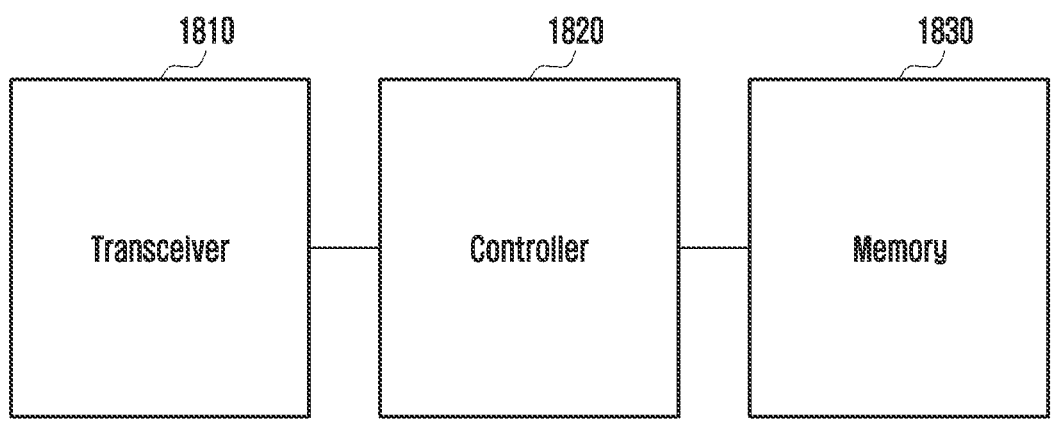
FIG. 18 is a diagram illustrating the configuration of a UE according to an embodiment of the disclosure.

FIG. 18 is a diagram illustrating the configuration of a UE according to an embodiment of the disclosure.

Referring to FIG. 17, the base station according to an embodiment of the disclosure may include the DU of an NR base station, the CU of the NR base station and an LTE base station.

The base station according to an embodiment of the disclosure may include a transceiver 1710, a controller 1720 (e.g., at least one processor), and a memory 1730. In the disclosure, the controller 1720 of the base station may be defined as a circuit or an application-specific integration circuit or at least one processor.

First, the transceiver 1710 of the base station according to an embodiment of the disclosure may transmit and receive signals to and from another network entity. For example, the transceiver 1710 may perform wireless communication with an external device, such as a UE, through a wireless interface, or may perform communication with another base station or network function entity using a given interface unit 1711.

For example, the interface unit 1711 of the transceiver 1710 of the CU of the NR base station may include a fronthaul interface unit for communicating with the DU of the NR base station, and may include an X2 interface unit for communicating with the LTE base station. Furthermore, for example, the interface unit 1711 of the transceiver 1710 of the DU of the NR base station may include a fronthaul interface unit for communicating with the CU of the NR base station. Furthermore, for example, the interface unit 1711 of the transceiver 1710 of the LTE base station may include an X2 interface unit for communicating with the CU of the NR base station.

The controller 1720 of the base station according to an embodiment of the disclosure may control an overall operation of the base station according to an embodiment proposed in the disclosure. For example, the controller 1720 may control the transceiver 1710 and the memory 1730 to perform the operations according to the embodiments described in the drawings.

More specifically, the controller 1720 of the DU of the NR base station may detect whether the update of UE context is necessary through communication with a UE, and may control the transceiver 1710 to transmit, to the CU of the NR base station, a message to request the corresponding context update. For another example, the controller 1720 of the CU of the NR base station may initiate a UE context update procedure in response to a request message received from the DU of the NR base station, and may control the transceiver 1710 to transmit, to the DU of the NR base station, a message including corresponding information. For another example, the controller 1720 of the LTE base station may perform a context update procedure along with a UE based on a UE context update request received from the NR base station, and may control the transceiver 1710 to transmit corresponding results to the NR base station.

The memory 1730 of the base station according to an embodiment of the disclosure may store at least one of information transmitted and received through the transceiver 1710 and information generated through the controller 1720. For example, the memory 1730 of the NR base station may store a function separation method of a fronthaul interface configured between the CU and the DU and parameters for each layer.

Referring to FIG. 18, the UE according to an embodiment of the disclosure may include a transceiver 1810, a controller 1820 (e.g., at least one processor), and a memory 1830. In the disclosure, the controller 1820 of the UE may be defined as a circuit or an application-specific integration circuit or at least one processor.

First, the transceiver 1810 of the UE according to an embodiment of the disclosure may transmit and receive signals to and from another network entity. For example, the transceiver 1810 may transmit and receive radio signals to and from an external device or a base station through a radio interface.

Furthermore, the controller 1820 of the UE according to an embodiment of the disclosure may control an overall operation of the UE according to an embodiment proposed in the disclosure. For example, the controller 1820 may control to perform a UE context update operation based on an RRC message received from a base station.

Furthermore, the memory 1830 of the UE according to an embodiment of the disclosure may store information transmitted and received through the transceiver 1810 and information generated through the controller 1820.

Unlike in the case where the REFUSE message described in FIGS. 14 and 15 is transmitted, according to another embodiment of the disclosure, a method of notifying the failure of an F1 UE CONTEXT MODIFICATION REQUIRED/CONFIRM procedure by transmitting an F1 UE CONTEXT CONFIRM message without using an F1 UE CONTEXT MODIFICATION REFUSE message may be used.

Figure 19:
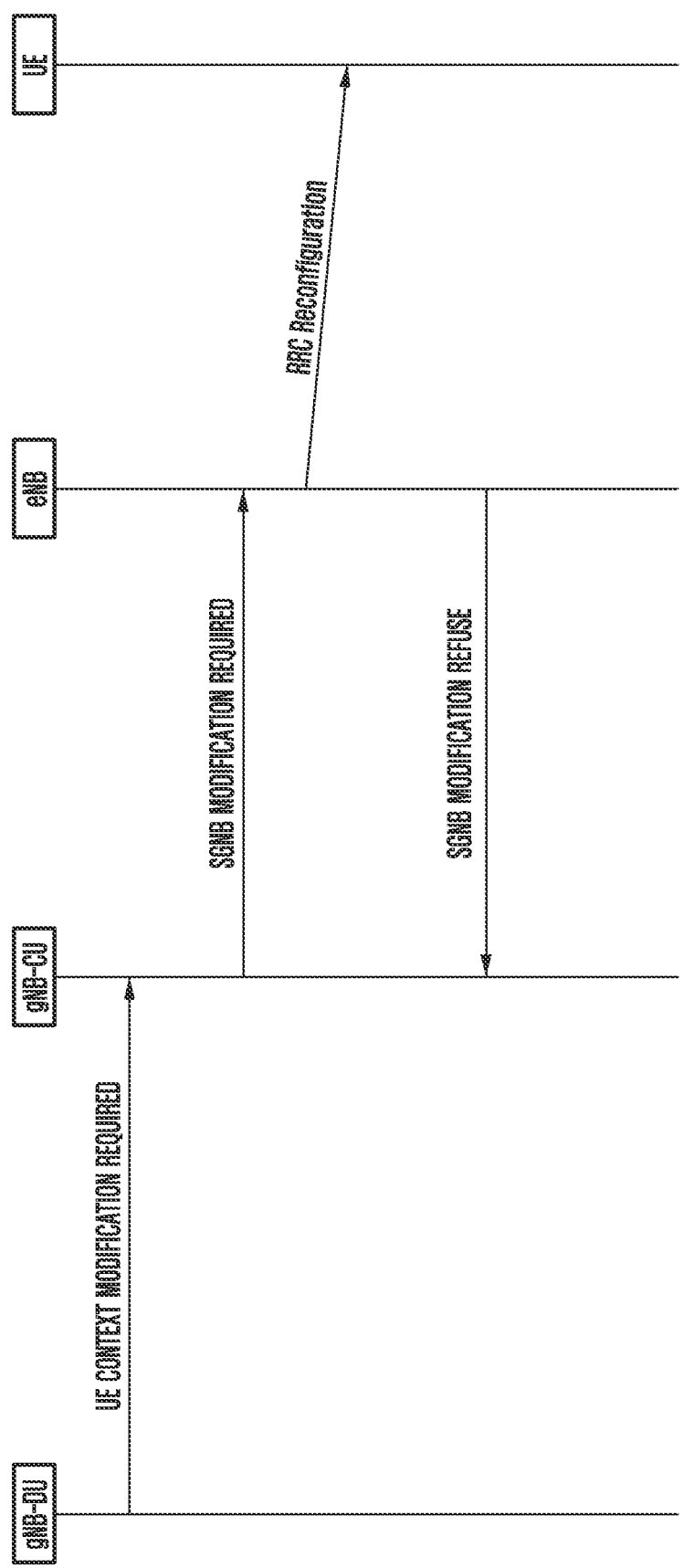
FIG. 19 is a diagram for describing an embodiment in which a UE CONTEXT MODIFICATION REFUSE message is not used according to an embodiment of the disclosure.

FIG. 19 is a diagram for describing an embodiment in which a UE CONTEXT MODIFICATION REFUSE message is not used according to an embodiment of the disclosure.

Referring to FIG. 19, after transmitting a UE CONTEXT MODIFICATION REQUIRED to a CU, a DU according to an embodiment of the disclosure drives a timer for the transmission of the message. After receiving the corresponding message, the CU transmits X2 SGNB MODIFICATION REQUIRED to an eNB and then drives a timer. If an RRC Reconfiguration procedure fails due to a given cause (e.g., a UE-side process failure), the eNB transmits X2 SGNB MODIFICATION REFUSE to the CU after the timer expires.

The CU that has received the X2 SGNB MODIFICATION REFUSE may notify a UE context modification procedure failure without transmitting any message instead of using F1 UE CONTEXT MODIFICATION REFUSE. If any response is not received, the DU may consider the F1 UE CONTEXT MODIFICATION REQUIRED procedure to have failed after the timer expires because the timer is driving (however, the corresponding scheme requires a prerequisite that the CU can transmit an F1 UE CONTEXT MODIFICATION CONFIRM message to the DU only if the CU has to regularly receive an X2 SGNB MODIFICATION CONFIRM message from the eNB).

For another example, a method of notifying the failure of an F1 UE CONTEXT MODIFICATION REQUIRED/CONFIRM procedure by including a refuse indication IE while transmitting an F1 UE CONTEXT MODIFICATION CONFIRM message without an F1 UE CONTEXT MODIFICATION REFUSE message may be used.

Figure 20:
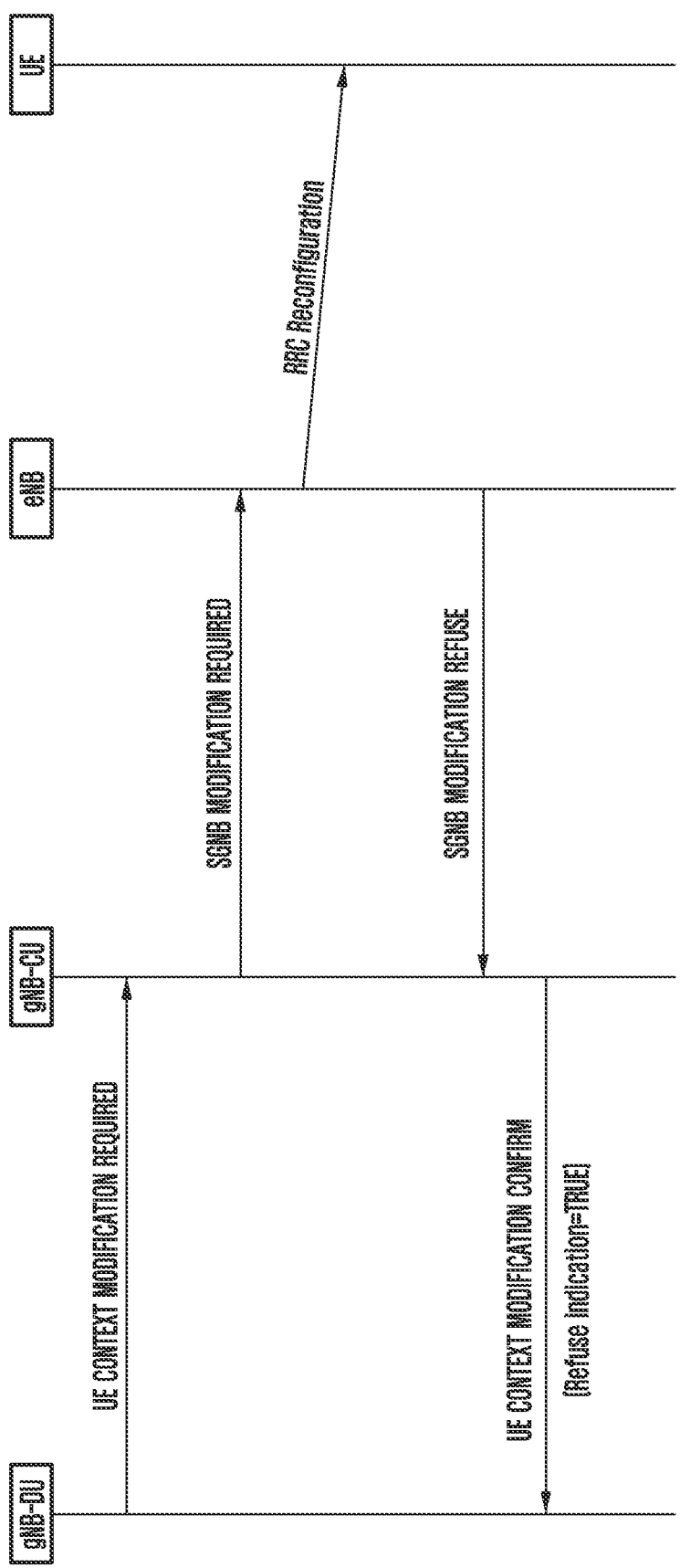
FIG. 20 is a flowchart for describing a method of notifying a failure of a UE CONTEXT procedure using an F1 UE CONTEXT MODIFICATION CONFIRM message according to an embodiment of the disclosure.

FIG. 20 is a flowchart for describing a method of notifying a failure of a UE CONTEXT procedure using an F1 UE CONTEXT MODIFICATION CONFIRM message according to an embodiment of the disclosure.

Referring to FIG. 20, after transmitting UE CONTEXT MODIFICATION REQUIRED to a CU, a DU drives a timer for the transmission of the message. After receiving the corresponding message, the CU transmits X2 SGNB MODIFICATION REQUIRED to an eNB and then drives a timer. If an RRC Reconfiguration procedure fails due to a given cause (e.g., a UE-side process failure), the eNB transmits X2 SGNB MODIFICATION REFUSE to the CU after the timer expires.

The CU that has received X2 SGNB MODIFICATION REFUSE may notify a UE context modification procedure failure by transmitting an F1 UE CONTEXT MODIFICATION CONFIRM message including a Refuse Indication IE instead of using F1 UE CONTEXT MODIFICATION REFUSE. The following table illustrates an F1 UE CONTEXT MODIFICATION CONFIRM message format to which a corresponding Refuse Indication IE has been added.

TABLE 4

| Information Element | Description |
| --- | --- |
| CU UE ID | Unique identifier for UE over the F1 interface within a CU |
| DU UE ID | Unique identifier for UE over the F1 interface within a DU |
| RRC Container | RRC message container which is delivered to CU |
| Refuse Indication | This information element indicates whether the F1 UE CONTEXT MODIFICATION REQUIRED procedure is failed or not. TRUE = fail FALSE = success |

For another example, a method of not including an RRC container IE in F1 UE CONTEXT MODIFICATION CONFIRM may be taken into consideration.

Figure 21:
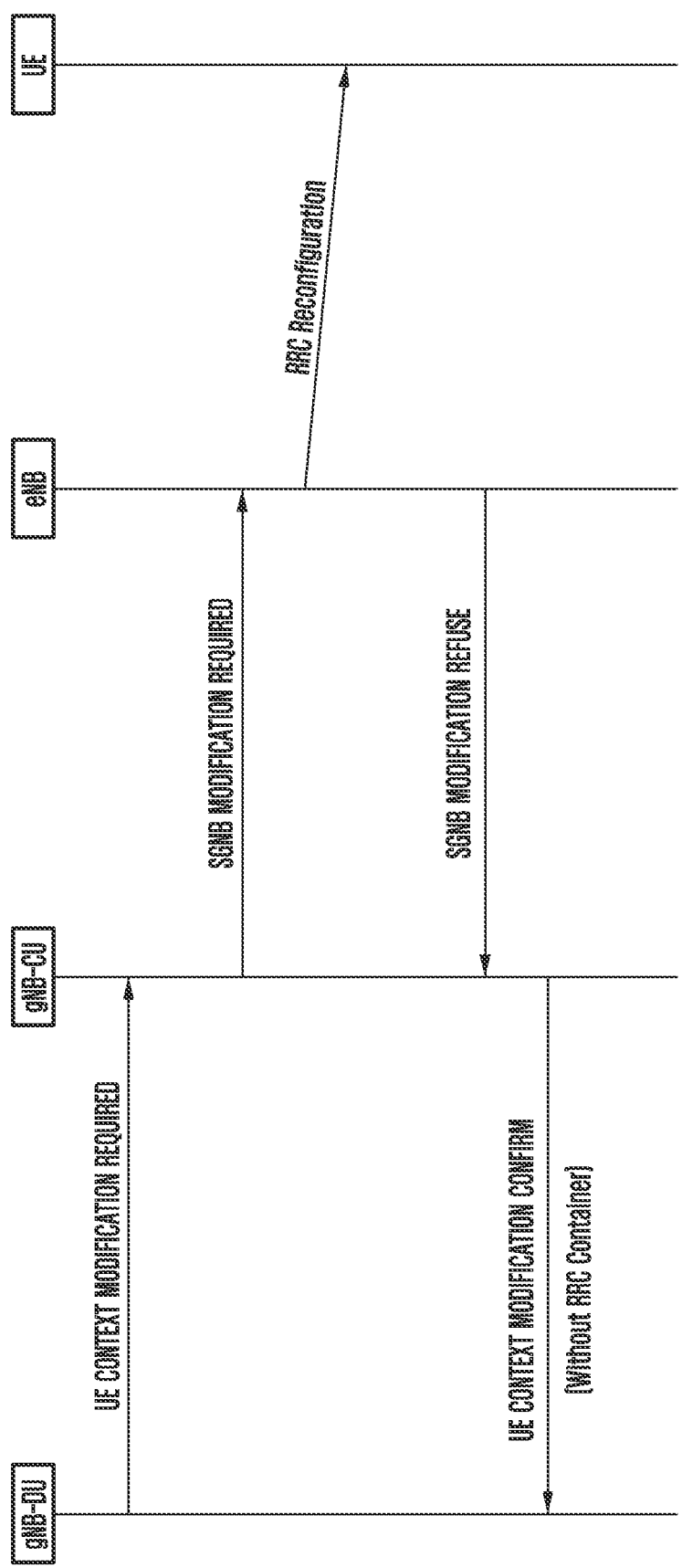
FIG. 21 is a diagram for describing a method of notifying a failure of a UE context update procedure, indicating that an RRC container IE is not included in an F1 UE CONTEXT MODIFICATION CONFIRM message according to an embodiment of the disclosure.

FIG. 21 is a diagram for describing a method of notifying a failure of a UE context update procedure, indicating that an RRC container IE is not included in an F1 UE CONTEXT MODIFICATION CONFIRM message according to an embodiment of the disclosure.

Referring to FIG. 21, a method of notifying the failure of an F1 UE CONTEXT MODIFICATION REQUIRED/CONFIRM procedure by not intentionally including a mandatory RRC container IE while transmitting an F1 UE CONTEXT MODIFICATION CONFIRM message without using an F1 UE CONTEXT MODIFICATION REFUSE message may be used.

The following table illustrates an F1 UE CONTEXT MODIFICATION CONFIRM message format from which an RRC container IE has been omitted.

TABLE 5

| Information Element | Description |
| --- | --- |
| CU UE ID | Unique identifier for UE over the F1 interface within a CU |
| DU UE ID | Unique identifier for UE over the F1 interface within a DU |

Figure 22:
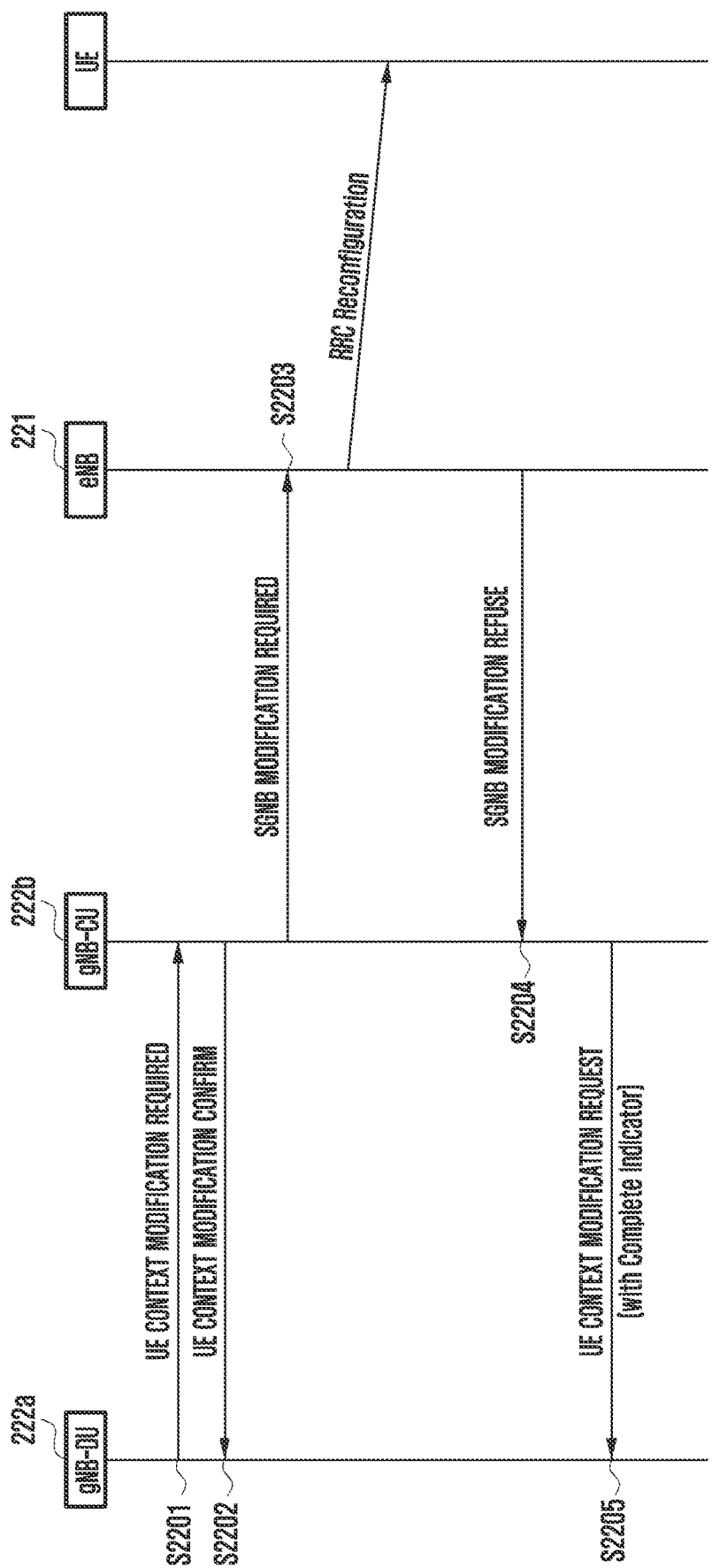
FIG. 22 is a diagram for describing an embodiment for a change after CONFIRM for a UE CONTEXT MODIFICATION REQUIRED request according to an embodiment of the disclosure.

FIGS. 22 and 23 are diagrams for describing methods for a change after CONFIRM for a UE CONTEXT MODIFICATION REQUIRED request from a first node to a second node according to various embodiments of the disclosure. As described above, the first node according to an embodiment of the disclosure may be understood as the DU (gNB-DU) of an NR base station, the second node may be understood as the CU (gNB-CU) of the NR base station, and a third node may be understood as an LTE base station.

Referring to FIGS. 22 and 23, if it is determined that an UE context update is necessary, the first node 222a, 232a according to an embodiment of the disclosure may transmit, to the second node 222b, 232b, a message (UE CONTEXT MODIFICATION REQUIRED) to request the UE context update (S2201, S2301). The second node 222b, 232b may transmit, to the first node 222a, 232a, a message (UE CONTEXT MODIFICATION CONFIRM) for confirming the reception of the message (S2202, S2302). Furthermore, in response to the request, the second node 222b, 232b according to an embodiment of the disclosure may transmit, to the third node 221, 231, a message (SGNB CONTEXT MODIFICATION REQUIRED) for the UE context update (S2203, S2303).

If X2 SGNB MODIFICATION CONFIRM has not been received from the third node 221, 231 before a timer expires as illustrated in FIG. 22 or a message of X2 SGNB MODIFICATION REFUSE has been received from the third node 221, 231 (S2204) as illustrated in FIG. 23 as a response to the transmission of the X2 SGNB MODIFICATION REQUIRED from the second node 222b, 232b to the third node 221, 231, the second node 222b, 232b according to an embodiment of the disclosure may transmit a UE Context Modification Request message, including a Complete Indicator having a value of 'FALSE', when it transmits the UE Context Modification Request message to the first node 222a, 232a (S2204, S2304).

Thereafter, when the Complete Indicator having a value of 'FALSE' is received, the first node 222a, 232a according to an embodiment of the disclosure may retransmit a UE Context Modification Required message to the second node 222b, 232b.

As described above, the confirm message including the complete indicator may be understood as 'Meaningful Confirm' as illustrated in the drawings.

According to an embodiment of the disclosure, in the situation in which several nodes are involved for a UE context update, a node that has first requested a UE context update is notified of result information for a UE context update procedure. Accordingly, there is an effect in that a node can perform an operation suitable for each situation of the success or failure of a corresponding procedure without unnecessary resource consumption.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a distributed unit (DU) of a next generation node B (gNB) in a wireless communication system, the method comprising:

transmitting, to a central unit (CU) of the gNB, a user equipment (UE) context modification required message to request a UE context modification;

receiving, from the CU, a UE context modification refuse message indicating that the UE context modification is unsuccessful; and receiving, from the CU, a UE context modification request message including a complete indicator of a reconfiguration procedure, wherein the reconfiguration procedure is based on a change of at least one parameter of the DU of the gNB signaled to the gNB-CU, wherein the reconfiguration procedure is associated with an evolved node B (eNB) and the eNB and the gNB are configured in a dual connectivity, wherein the UE context modification required message includes a gNB-CU UE identifier (ID) for identifying a UE within the CU and a gNB-DU UE ID for identifying a UE within the DU, wherein the UE context modification refuse message includes the gNB-CU UE ID, the gNB-DU UE ID, and information on a cause of the unsuccessful UE context modification, wherein the CU is associated with a radio resource control (RRC) layer and a packet data convergence protocol (PDCP) layer, and wherein the DU is associated with a radio link control (RLC) layer, a medium access control (MAC) layer, and a physical (PHY) layer.

2. The method of claim 1, further comprising:

transmitting, to the CU of the gNB, a previous UE context modification required message including a resource coordination transfer container; and receiving, from the CU of the gNB, a UE context modification confirm message in response to the previous UE context modification required message, wherein the resource coordination transfer container includes a secondary gNB (SgNB) resource coordination information element (IE) for the eNB, and wherein the SgNB resource coordination IE includes information on a new radio (NR) cell global identity (CGI) and coordination information.

3. The method of claim 2,
wherein the DU of the gNB and the CU of the gNB are connected through a F1 interface, and
wherein the CU of the gNB and the eNB are connected through an X2 interface.

4. The method of claim 1, wherein the UE context modification required message includes identification information on one or more data radio bearers (DRBs) to be modified and downlink (DL) user plane (UP) tunnel (TNL) information.

5. A method performed by a central unit (CU) of a next generation node B (gNB) in a wireless communication system, the method comprising:
receiving, from a distributed unit (DU) of the gNB, a user equipment (UE) context modification required message to request a UE context modification;
transmitting, to the DU of the gNB, a UE context modification refuse message, in case that the UE context modification is unsuccessful; and
transmitting, to the DU of the gNB, a UE context modification request message including a complete indicator of a reconfiguration procedure,
wherein the reconfiguration procedure is based on a change of at least one parameter of the DU of the gNB signaled to the gNB-CU,
wherein the reconfiguration procedure is associated with an evolved node B (eNB) and the eNB and the gNB are configured in a dual connectivity,
wherein the UE context modification required message includes a gNB-CU UE identifier (ID) for identifying a UE within the CU and a gNB-DU UE ID for identifying a UE within the DU,
wherein the UE context modification refuse message includes the gNB-CU UE ID, the gNB-DU UE ID, and information on a cause of the unsuccessful UE context modification,
wherein the CU is associated with a radio resource control (RRC) layer and a packet data convergence protocol (PDCP) layer, and
wherein the DU is associated with a radio link control (RLC) layer, a medium access control (MAC) layer, and a physical (PHY) layer.

6. The method of claim 5, further comprising:
receiving, from the DU of the gNB, a previous UE context modification required message including a resource coordination transfer container; and
transmitting, to the DU of the gNB, a UE context modification confirm message in response to the previous UE context modification required message,
wherein the resource coordination transfer container includes a secondary gNB (SgNB) resource coordination information element (IE) transmitted from the CU to the eNB, and
wherein the SgNB resource coordination IE includes information on a new radio (NR) cell global identity (CGI) and coordination information.

7. The method of claim 6, further comprising:
transmitting, to the eNB, a modification required message including the SgNB resource coordination IE; and
receiving, from the eNB, a modification confirm message based on the RRC reconfiguration.

8. The method of claim 6,
wherein the DU of the gNB and the CU of the gNB are connected through a F1 interface, and
wherein the CU of the gNB and the eNB are connected through an X2 interface.

9. The method of claim 5,
wherein the UE context modification required message includes identification information on one or more data radio bearers (DRBs) to be modified and downlink (DL) user plane (UP) tunnel (TNL) information.

10. A distributed unit (DU) of a next generation node B (gNB) in a wireless communication system, the DU of the gNB comprising:
at least one transceiver; and
at least one processor configured to:
transmit, to a central unit (CU) of the gNB via the at least one transceiver, a user equipment (UE) context modification required message to request a UE context modification,
receive, from the CU of the gNB via the at least one transceiver, a UE context modification refuse message indicating that the UE context modification is unsuccessful, and
receive, from the CU via the at least one transceiver, a UE context modification request message including a complete indicator of a reconfiguration procedure,
wherein the reconfiguration procedure is based on a change of at least one parameter of the DU of the gNB signaled to the gNB-CU,
wherein the reconfiguration procedure is associated with an evolved node B (eNB) and the eNB and the gNB are configured in a dual connectivity,
wherein the UE context modification required message includes a gNB-CU UE identifier (ID) for identifying a UE within the CU and a gNB-DU UE ID for identifying a UE within the DU,
wherein the UE context modification refuse message includes the gNB-CU UE ID, the gNB-DU UE ID, and information on a cause of the unsuccessful UE context modification,
wherein the CU is associated with a radio resource control (RRC) layer and a packet data convergence protocol (PDCP) layer, and
wherein the DU is associated with a radio link control (RLC) layer, a medium access control (MAC) layer, and a physical (PHY) layer.

11. The DU of the gNB of claim 10, wherein the at least one processor is further configured to:
transmit, to the CU of the gNB via the at least one transceiver, a previous UE context modification required message including a resource coordination transfer container; and
receive, from the CU of the gNB via the at least one transceiver, a UE context modification confirm message in response to the previous UE context modification required message,
wherein the resource coordination transfer container includes a secondary gNB (SgNB) resource coordination information element (IE) for the eNB and
wherein the SgNB resource coordination IE includes information on a new radio (NR) cell global identity (CGI) and coordination information.

12. The DU of the gNB of claim 11,
wherein the DU of the gNB and the CU of the gNB are connected through a F1 interface, and
wherein the CU of the gNB and the eNB are connected through an X2 interface.

13. The DU of the gNB of claim 10,
wherein the UE context modification required message includes identification information on one or more data radio bearers (DRBs) to be modified and downlink (DL) user plane (UP) tunnel (TNL) information.

14. A central unit (CU) of a next generation node B (gNB) in a wireless communication system, the CU of the gNB comprising:
- at least one transceiver; and
- at least one processor configured to:
  - receive, from a distributed unit (DU) of the gNB via the at least one transceiver, a user equipment (UE) context modification required message to request a UE context modification, wherein a message for requesting an operation of the UE context modification between a UE and an evolved node B (eNB) is transmitted to the eNB,
  - transmit, to the DU of the gNB via the at least one transceiver, a UE context modification refuse message in case that the UE context modification is unsuccessful, and
  - transmit, to the DU of the gNB via the at least one transceiver, a UE context modification request message including a complete indicator of a reconfiguration procedure,
- wherein the reconfiguration procedure is based on a change of at least one parameter of the DU of the gNB signaled to the gNB-CU,
- wherein the reconfiguration procedure is associated with an evolved node B (eNB) and the eNB and the gNB are configured in a dual connectivity,
- wherein the UE context modification required message includes a gNB-CU UE identifier (ID) for identifying a UE within the CU and a gNB-DU UE ID for identifying a UE within the DU,
- wherein the UE context modification refuse message includes the gNB-CU UE ID, the gNB-DU UE ID, and information on a cause of the unsuccessful UE context modification,
- wherein the CU is associated with a radio resource control (RRC) layer and a packet data convergence protocol (PDCP) layer, and
- wherein the DU is associated with a radio link control (RLC) layer, a medium access control (MAC) layer, and a physical (PHY) layer.

15. The CU of the gNB of claim 14, wherein the at least one processor is further configured to:
- receive, from the DU of the gNB via the at least one transceiver, a previous UE context modification required message including a resource coordination transfer container; and
- transmit, to the DU of the gNB via the at least one transceiver, a UE context modification confirm message in response to the previous UE context modification required message,
- wherein the resource coordination transfer container includes a secondary gNB (SgNB) resource coordination information element (IE) transmitted from the CU to the eNB and
- wherein the SgNB resource coordination IE includes information on a new radio (NR) cell global identity (CGI) and coordination information.

16. The CU of the gNB of claim 15, wherein the at least one processor is further configured to:
- transmit, to the eNB via the at least one transceiver, a modification required message including the SgNB resource coordination IE; and
- receive, from the eNB via the at least one transceiver, a modification confirm messages
based on the RRC reconfiguration.

17. The CU of the gNB of claim 15,
- wherein the DU of the gNB and the CU of the gNB are connected through a F1 interface, and
- wherein the CU of the gNB and the eNB are connected through an X2 interface.

18. The CU of the gNB of claim 14,
- wherein the UE context modification required message includes identification information on one or more data radio bearers (DRBs) to be modified and downlink (DL) user plane (UP) tunnel (TNL) information.

* * * * *